United States Patent
Lezec et al.

(10) Patent No.: US 7,057,151 B2
(45) Date of Patent: Jun. 6, 2006

(54) OPTICAL TRANSMISSION APPARATUS WITH DIRECTIONALITY AND DIVERGENCE CONTROL

(75) Inventors: Henri Joseph Lezec, Strasbourg (FR); Thomas Wren Ebbesen, Strasbourg (FR)

(73) Assignees: Universite Louis Pasteur, Strasbourg (FR); Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 10/487,669

(22) PCT Filed: Aug. 30, 2002

(86) PCT No.: PCT/EP02/11047

§ 371 (c)(1),
(2), (4) Date: Feb. 25, 2004

(87) PCT Pub. No.: WO03/019245

PCT Pub. Date: Mar. 6, 2003

(65) Prior Publication Data

US 2004/0190116 A1    Sep. 30, 2004

Related U.S. Application Data

(60) Provisional application No. 60/316,247, filed on Aug. 31, 2001.

(51) Int. Cl.
*H01J 5/16* (2006.01)
(52) U.S. Cl. .................. 250/216; 359/244; 359/245; 359/738
(58) Field of Classification Search .............. 250/306, 250/307, 308, 309, 310, 311, 208.1, 227.11, 250/216; 359/298, 245, 738, 244
See application file for complete search history.

(56) References Cited

U.S. PATENT DOCUMENTS 6,649,901 B1 * 11/2003 Thio et al. ............... 250/216
6,834,027 B1 * 12/2004 Sakaguchi et al. ....... 369/13.32

OTHER PUBLICATIONS

T. Thio, H.J. Lezec, T.W. Ebbesen:, "Strongly enhanced optical transmission through subwavelength holes in metal films", PHYSICA B, vol. 279, 2000, pp. 90-93, XP002236331, abstract, p. 91, paragraph 2 -p. 92, paragraph 3; figure 2.
Ghaemi H F et al:, Surface plasmons enhance optical transmission thrugh subwavelength holes:, Physical Review, B. Condensed Matter, American Institute of Physics. New York, US. vol. 58, No. 11, Sep. 15, 1998, pp. 6779-6782, XP002133008, ISSN: 0163-1829 cited in the application p. 6780.

* cited by examiner

*Primary Examiner*—Hung xuan Dang
*Assistant Examiner*—Tuyen Tra
(74) *Attorney, Agent, or Firm*—Young & Thompson

(57) ABSTRACT

An apparatus for emitting light with a controlled directionality and optical divergence from at least one opening includes a light impervious surface structure having the at least one opening, a periodic or quasi-periodic surface topography including one or several surface feature(s) and associated with the at least one opening on the surface structure, whereby light emerging from the opening(s) interacts with surface waves on the surface structure (20) thereby providing controlled directionality and optical divergence of the emitted light.

31 Claims, 20 Drawing Sheets

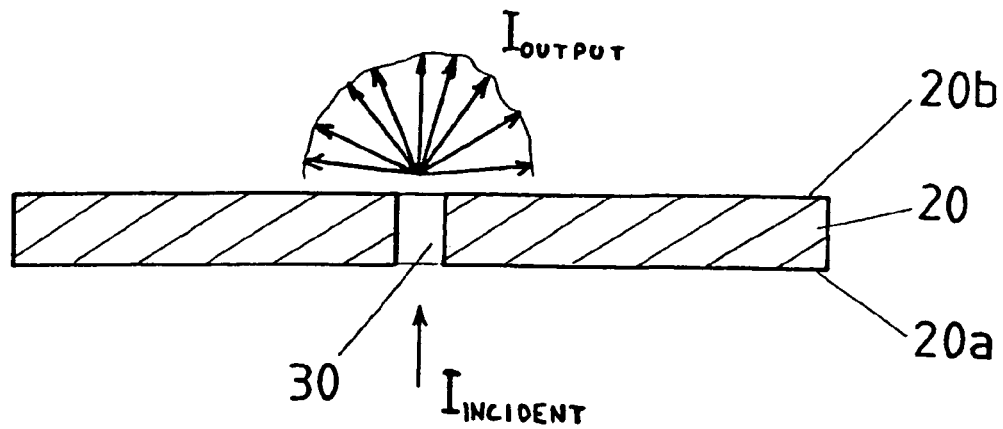
Fig-6A
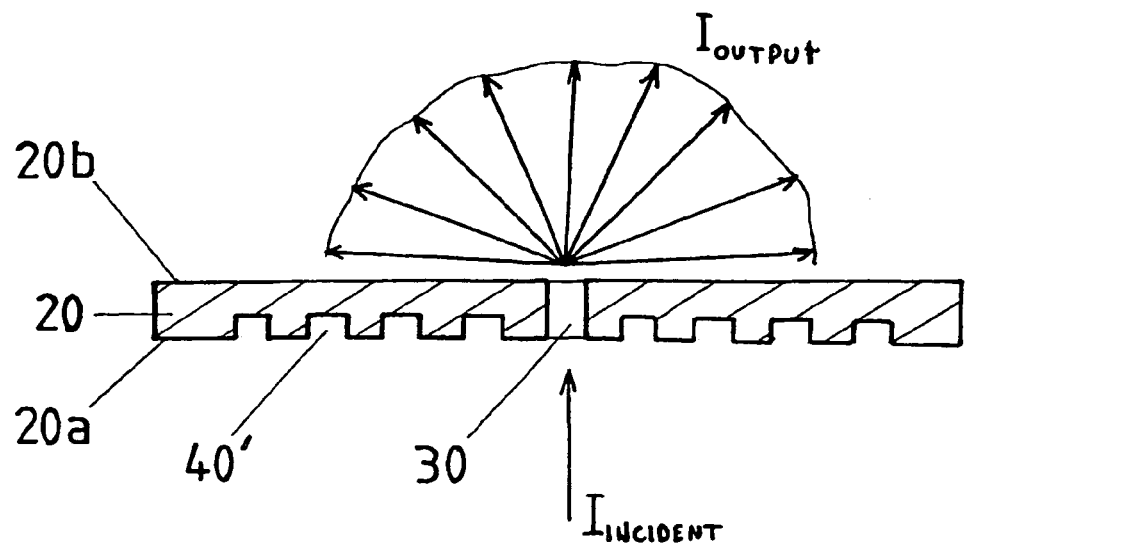
Fig-6B
Fig-6

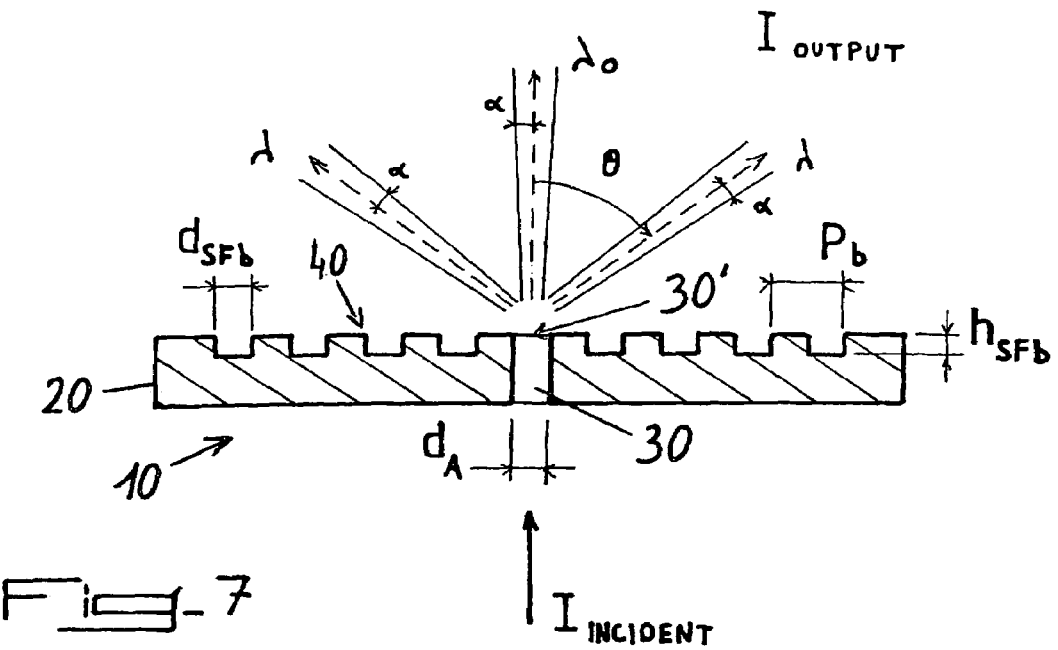
FIG. 7
FIG. 7A
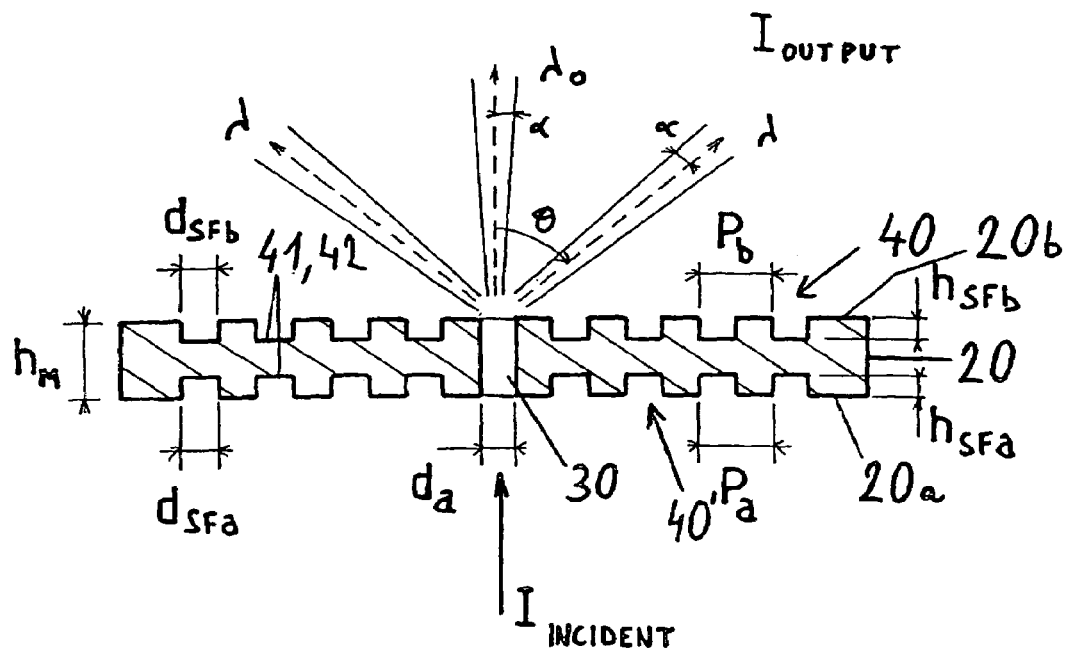
FIG. 7B

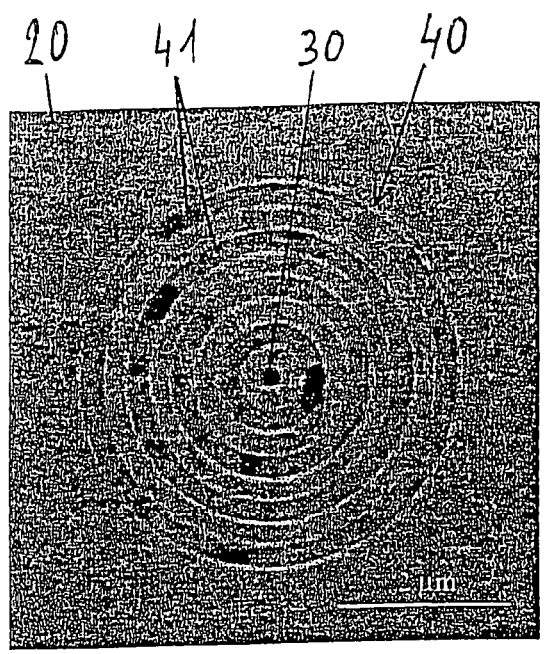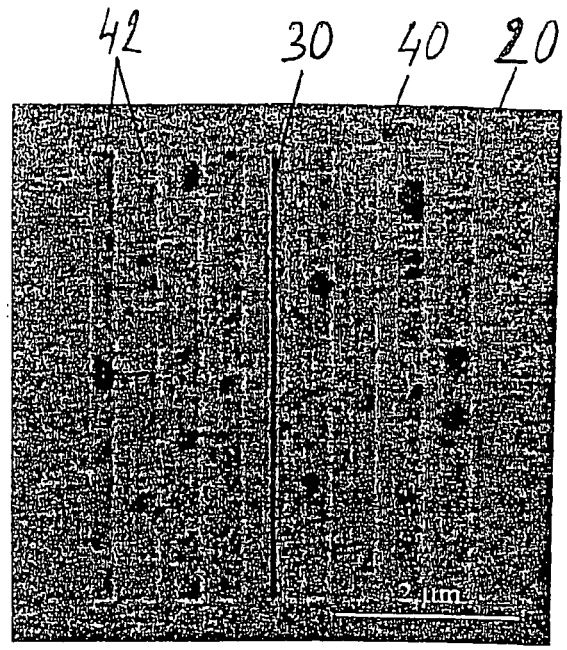
Fig. 12A
Fig. 12B
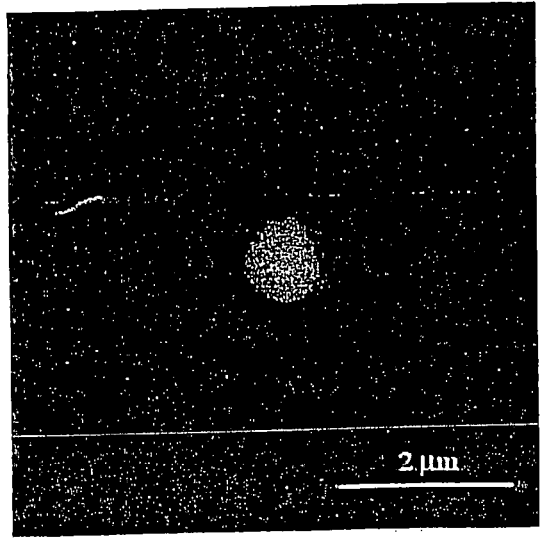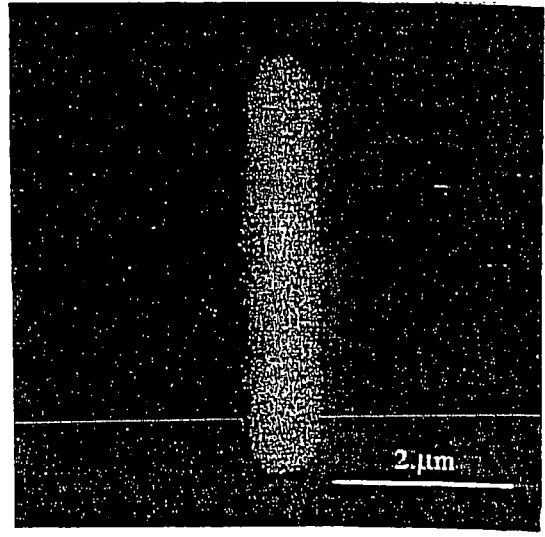
Fig 12C
Fig 12D

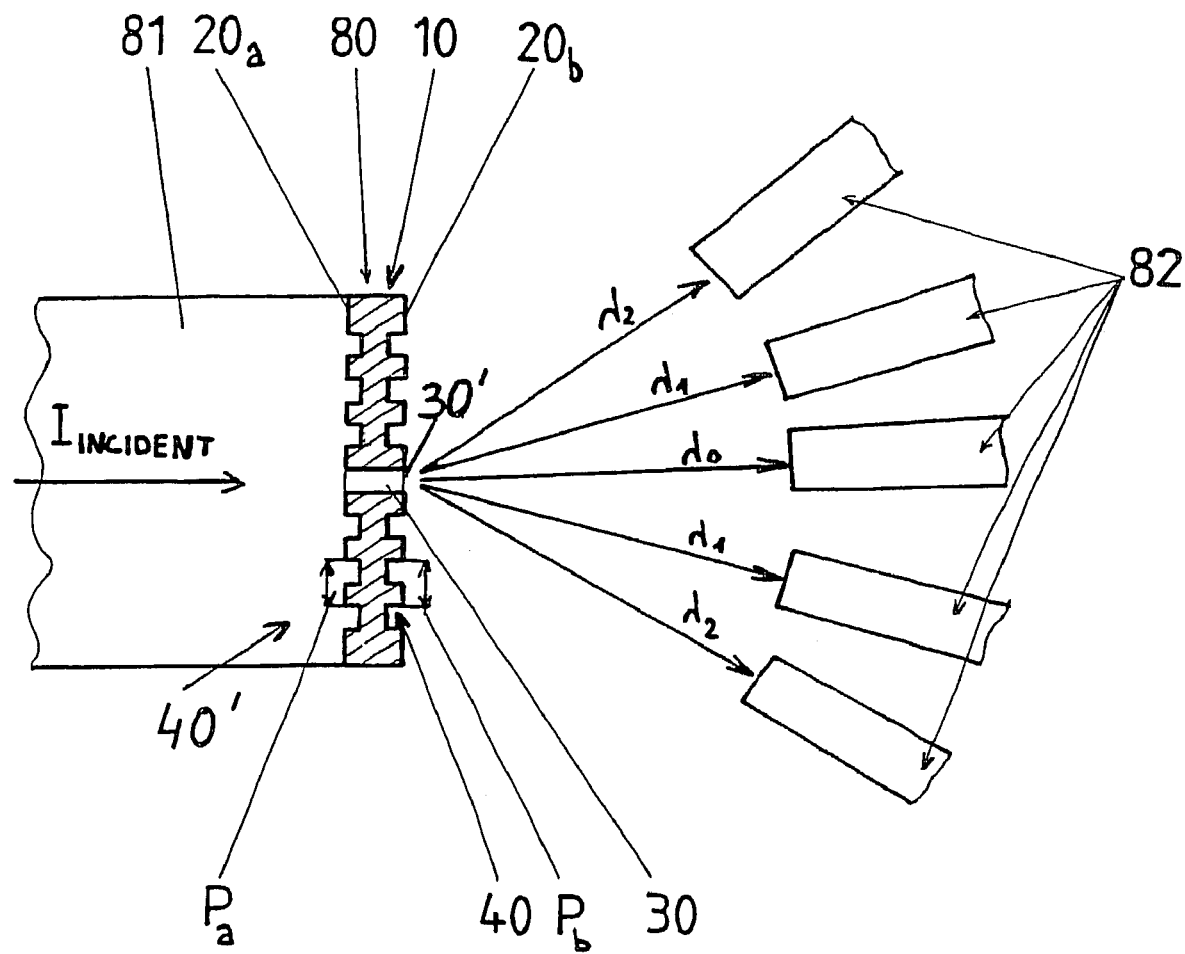

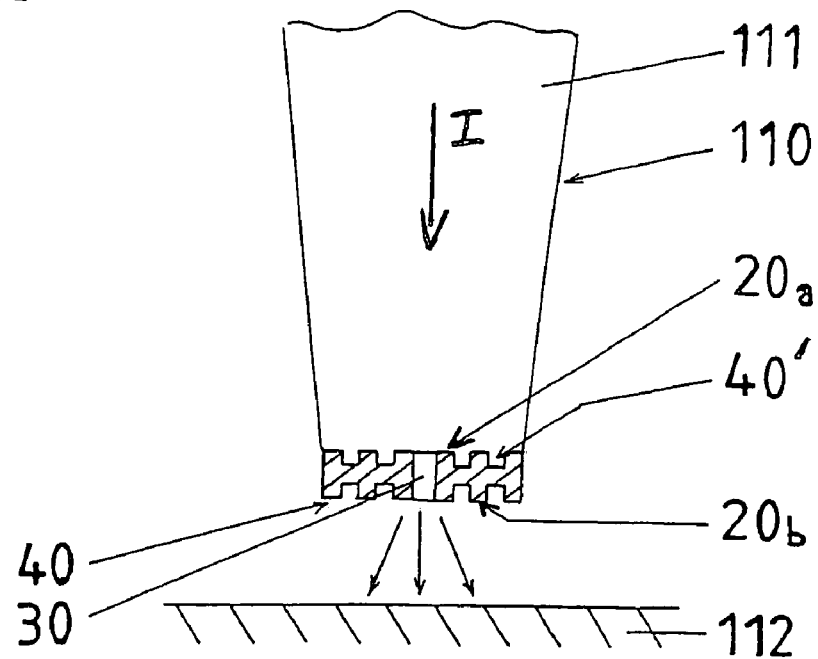
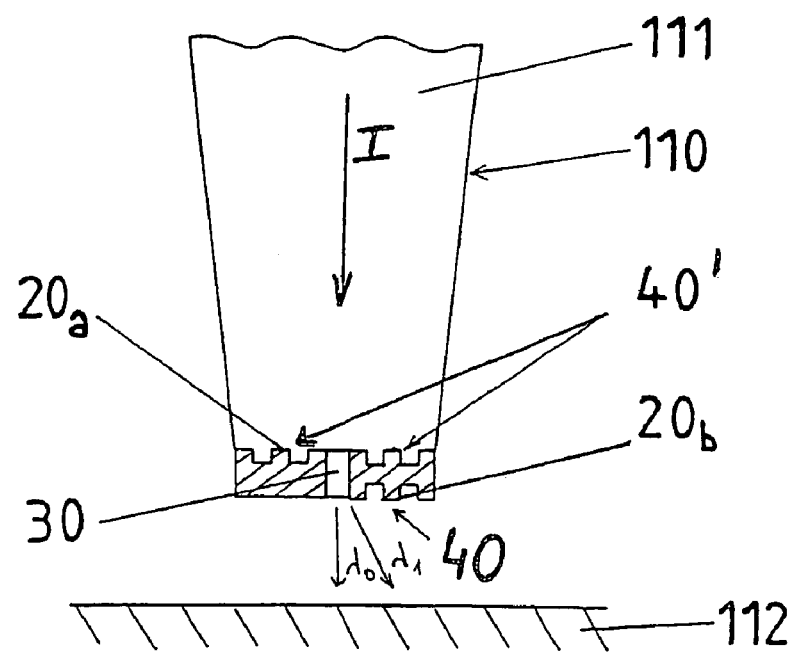

Fig-21
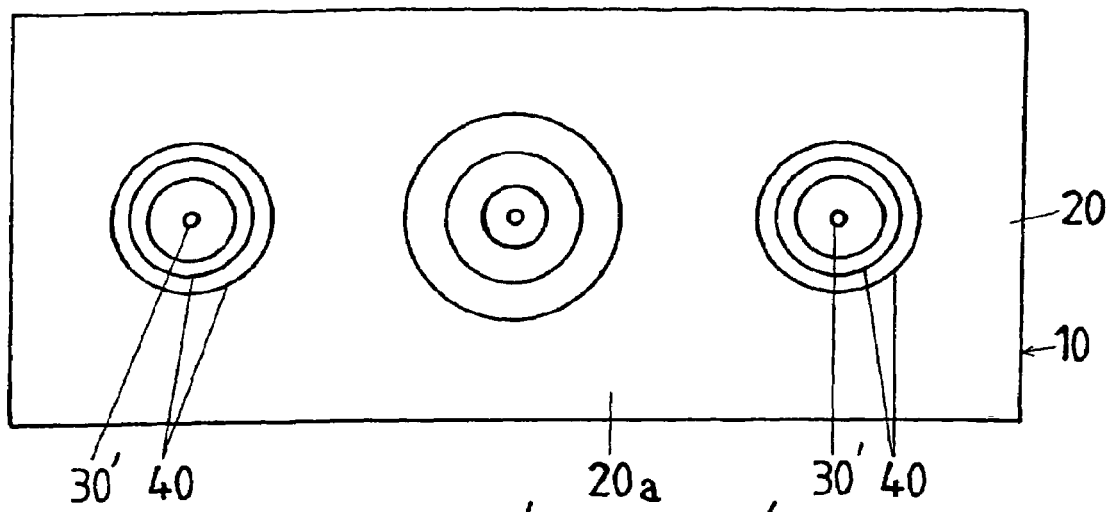
Fig-22
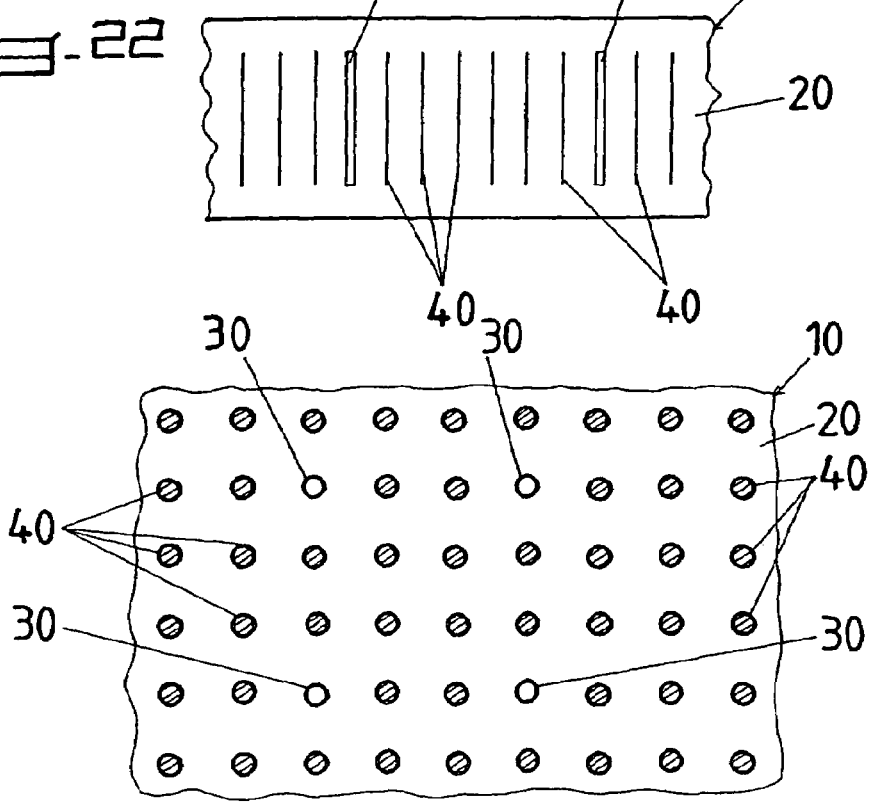
Fig-23

OPTICAL TRANSMISSION APPARATUS WITH DIRECTIONALITY AND DIVERGENCE CONTROL

CROSS REFERENCE TO RELATED APPLICATIONS

This is the 35 USC 371 National Stage of International Application PCT/EP02/11047 filed on Aug. 30, 2002, which designated the United States of America. International Application PCT/EP02/11047 claims priority of U.S. Application No. 60/316,247, filed on Aug. 31, 2001, the entire contents of which are hereby incorporated by reference.

FIELD OF THE INVENTION

The present invention relates to the field of optics, and in particular to the enhanced transmission of light through or from a surface structure, such as a metal film, with one or more openings or apertures.

BACKGROUND OF THE INVENTION

As discussed in detail in U.S. Pat. No. 6,236,033 to Ebbesen et al., the optical transmission of a single, sub-wavelength aperture in a metal film can be strongly enhanced when the incident light is resonant with surface waves, such as surface plasmons, at the film's surface. In order to couple the incident radiation to the surface waves, the surface of the metal film must be provided with a periodic surface topography (i.e. surface features such as grooves or protrusions). The transmission enhancement has great potential in applications which require high optical throughput at high resolution, such as near-field microscopy and high-density optical data storage. This effect has the attractive feature that the wavelength of the resonance can be tuned by the periodicity of the surface features, the angle of incidence of the incident light and the refractive index of a dielectric provided substantially adjacent to the film. See, e.g., U.S. Pat. No. 5,973,316 to Ebbesen et al., U.S. Pat. No. 6,040,936 to Kim et al., U.S. Pat. No. 6,052,238 to Ebbesen et al., U.S. Pat. No. 6,236,033 to Ebbesen et al., and U.S. Pat. No. 6,285,020 to Kim et al. (each of these patents being incorporated herein by this reference and being referred to herein as the "Previous Patents").

Whether an apparatus comprises enhanced transmission or not through an aperture, there is an additional problem which reduces the practicality of the apparatus comprising a small aperture, namely diffraction. In other words, when light emerges from a small aperture it typically diffracts light in all directions, especially if the aperture has dimension(s) smaller than, or comparable to, the wavelength of the light that is transmitted. As a consequence, the spot size of the light emerging from the aperture increases rapidly and simultaneously the intensity of the light decreases with distance from said aperture. In addition there is no control over directionality. These features reduce significantly the practicality of such an apparatus for many applications (such as high density storage, near-field optical microscopy, optical interconnection) comprising one or more small apertures. For such applications, it would be desirable to have an apparatus which exhibit high transmission, controlled directionality and small optical divergence. While U.S. Pat. No. 6,236,033 to Ebbesen et al. describes enhanced transmission through a single aperture surrounded by periodic surface topography on at least one of the first and second surface of a metal film, no mention is made of the directionality and the divergence of the emerging light.

In relation with the problem of diffraction by small openings or apertures, the inventors have studied the effects of the periodic surface topography on the angular distribution of the light emerging from a single aperture and it has been found that the surface topography can also be used to provide control over directionality and divergence of the beam exiting the aperture. Surprisingly the divergence of the beam has been found much smaller than expected considering the area on the surface from which the light is radiated.

SUMMARY OF THE INVENTION

Generally speaking, in accordance with the invention, an apparatus for enhanced light emission or transmission with control over light directionality and divergence is provided. The apparatus comprises:

a light impervious surface structure comprising said at least one opening, a periodic or quasi-periodic surface topography comprising one or several surface feature(s) and associated with said at least one opening on said surface structure, whereby light ($I_{OUTPUT}$) emerging from said opening(s) interacts with surface waves on said surface structure thereby providing controlled directionality and optical divergence of the emitted light ($I_{OUTPUT}$)

According to a first feature of the invention, the or each surface topography has a periodic or quasi-periodic arrangement in at least one direction originating from the concerned opening and comprised within the surface plane of the surface structure.

The surface structure may comprise a single opening with a corresponding periodic or quasi-periodic surface topography.

The surface structure may alternatively comprise several spaced apart openings, each provided with a corresponding particular periodic or quasi-periodic surface topography.

The surface structure may also comprise several spaced apart openings, provided with at least a partially common periodic or quasi-periodic surface topography.

According to a first embodiment of the invention, each of the at least one opening corresponds to the opening of a recess or a cavity in the surface structure, accommodating a light source, preferably in the vicinity of said opening.

More particularly, each of the at least one opening corresponds to the opening of a blind hole, accommodating a light source, preferably in the vicinity of said opening.

According to a second and preferred embodiment of the invention, each of the at least one opening corresponds to the exit opening of an aperture extending through a film or plate like element or part comprising or formed by said surface structure, said element or part having, on one side, a first surface provided with the entry opening of said aperture and intended to be subjected to incident light ($I_{INCIDENT}$) and, on the other side, a second surface provided with said exit opening.

Preferably, the surface structure consists of a metal film having at least one aperture extending through it, wherein the surface of the film comprising the exiting opening is provided with said periodic or quasi-periodic surface topography.

The surface topography may comprise at least two protruding and/or recessing structural surface features and/or at least two surface features as structural or material discontinuities.

More precisely, the surface topography may comprise at least two continuous or discontinuous profiled surface features having, at least partly, a circular, triangular, rectangular or polygonal cross section and extending longitudinally on at least one side of the concerned opening or at least partly around this latter, within a given angular range or several ranges.

In addition or alternatively, the surface topography may also comprise a plurality of surface features as dimples and/or dead holes arranged in a periodic or quasi-periodic manner in at least one direction originating from the concerned opening.

In practice, the surface features as a periodic or quasi-periodic texture or structure can be made in various ways, materials and shapes.

Thus, they can be made of, defined by or filled with a material having a refractive index which is different from the refractive index of the material of the surface structure.

They can also consist of incrustations of a material having a refractive index which is different from the refractive index of the material of the surface structure, said incrustations being flush with said surface structure.

Furthermore, the surface structure and the surface features can be covered with a material having a selectively variable refractive index, said index being controllably adjustable by external triggering.

The arrangement and disposition of the surface features can also be carried out in various ways.

Thus, according to two alternatives of carrying out the invention, the surface features forming the surface topography may be arranged symmetrically around the opening(s) or asymmetrically around said opening(s), for example on one side only of a plane cutting said opening(s). They may also be either continuous or discontinuous.

In relation with the second embodiment mentioned before, the first surface can also be provided with a periodic or quasi-periodic surface topography associated with the at least one entry opening of the at least one aperture and comprising one or several surface feature(s).

Normally, the surface topography of the first surface and the surface topography of the second surface are identical.

Alternatively, at least one dimensional parameter and/or shape characteristic of the surface topography of the first surface can be, at least slightly, different from at least one corresponding dimensional parameter and/or shape characteristic of the surface topography of the second surface.

For example, the period or quasi-period of the surface topography of the first surface can be different from the period or quasi-period of the surface topography of the second surface.

In view of its use, the film or plate like element or part can be mounted on or in front of the exit surface of a light emitting or transmitting device or part or on or in front of the entry surface of a light receiving device or part.

The present invention also encompasses the use of an apparatus as described before for producing light with given directionality and limited angular divergence.

In relation with the second embodiment mentioned before, the inventors believe and one will understand that the light incident on one surface of the plate or film (preferably made of metal) interacts with the surface plasmon modes (surface wave modes) on at least one of the surfaces of the metal film thereby enhancing the transmission of light through at least one aperture in the metal film. As the light emerges from the aperture, it couples to the periodic surface topography on the exit side, launches surface waves which scatter periodically in the surface topography of the exit surface. This scattered light interferes with the main transmission of the aperture in the near-field to yield a beam with narrow angular divergence propagating away from the exit surface. The angle or direction in which the beam is directed depends on the wavelength of the light, the shape, period and lattice symmetry of the periodic surface topography on the exit surface and the number of periodic structures in the immediate vicinity of the aperture on the exit surface. The optical divergence of the exiting beams depends on the shape, period and lattice symmetry of the periodic surface topography on the exit surface and the number of periodic structures in the immediate vicinity of the aperture on the exit surface. The periodic surface topography includes surface features such as periodically arranged protrusions or depressions in the metal film surface. The aperture can be either cylindrical, square, rectangular or oblong like a slit. When in addition a periodic surface topography is provided on the incident side enabling the light to couple to surface waves or surface plasmons modes on the incident side and these matches the resonance modes of the surface topography on the exit a further enhancement of the enhanced light transmission is observed as compared to an apparatus having periodic surface topography on just one side.

The practical effects of these results is that the general enhanced optical transmission apparatus with controlled beam directionality and divergence of the present invention may be applied in and as various useful components, devices and systems.

Accordingly, a first other object of the present invention is to provide a wavelength multiplexing device comprising an apparatus as described before, with a single opening.

A further object of the invention is to provide a wavelength dispersion device comprising an apparatus as described before, preferably with a single opening.

A still further object of the invention is to provide an angular wavelength filter comprising an apparatus as described before, preferably with a single aperture.

A still further object of the present invention is to provide an improved read/write head for optical data storage media.

A still further object of the present invention is to provide a read/write head for optical storage media which provides multiple wavelength read/write capacity at different locations simultaneously.

A still further object of the present invention is to provide a near-field scanning optical microscope probe with one or more apertures which provides a more focused output light beam with improved enhanced transmission.

A still further object of the present invention is to provide a photolithographic mask with one or more apertures which improved enhanced light transmission and low optical divergence output light.

A still further object of the present invention is a light emitting device which provides a subwavelength output light beam with controlled directionality and divergence.

A still further object of the present invention is an optical switching device which provides selectively variable redirecting of a light beam at the exit of an aperture.

Other objects of the present invention are mentioned in the enclosed claims and will become more readily apparent in light of the following description in conjunction with the accompanying drawings.

BRIEF DESCRIPTION OF THE DRAWINGS

FIG. 6A is a cross-sectional view of an aperture provided in a metal film wherein neither of the two surfaces of the metal film includes a periodic surface topography;

FIG. 6B is a cross-sectional view of an aperture provided in a metal film wherein only the first surface includes a periodic surface topography;

FIG. 7A is a cross-sectional view of an aperture provided in a metal film wherein only the second surface of the metal film includes a periodic surface topography for the exemplary embodiment of an enhanced light transmission apparatus with divergence and directionality control of the present invention shown in FIG. 2;

FIG. 7B is a cross-sectional view of an aperture provided in a metal film wherein both the first surface and the second surface include a periodic surface topography for the exemplary embodiment of a further enhanced light transmission apparatus with divergence and directionality control of the present invention shown in FIG. 2;

FIG. 12A is a plan scanned image micrograph of a metal film having an aperture and a periodic surface topography, for the exemplary embodiment of an enhanced light transmission apparatus with divergence and directionality control of the present invention shown in FIG. 1, in which the surface features comprising the periodic surface topography has a period P=0,5 μm;

FIG. 12B is a plan scanned image micrograph of a metal film having an aperture and a periodic surface topography, for the exemplary embodiment of an enhanced light transmission apparatus with divergence and directionality control of the present invention shown in FIG. 2, in which the surface features comprising the periodic surface topography has a period P=0,5 μm;

FIG. 12C is a plan optical image of output light at the surface of the apparatus of the invention shown in FIG. 12A;

FIG. 12D is a plan optical image of output light at the surface of the apparatus of the invention shown in FIG. 12B;

FIG. 14A is a cross sectional view, schematic diagram of light beam multiplexer of the present invention;

FIG. 17A is a cross-sectional schematic diagram (not necessarily to scale) of a read/write head of the present invention;

FIG. 17B is a cross-sectional, schematic diagram (not necessarily to scale) of a variant of the read/write head of the present invention;

FIGS. 21 to 23 are schematic partial plan views of embodiments of apparatuses according to the invention with surfaces features similar respectively to the surface features shown in FIGS. 1 to 3 but having at least two openings or apertures.;

DETAILED DESCRIPTION OF THE PREFERRED EMBODIMENTS

Figure 1:
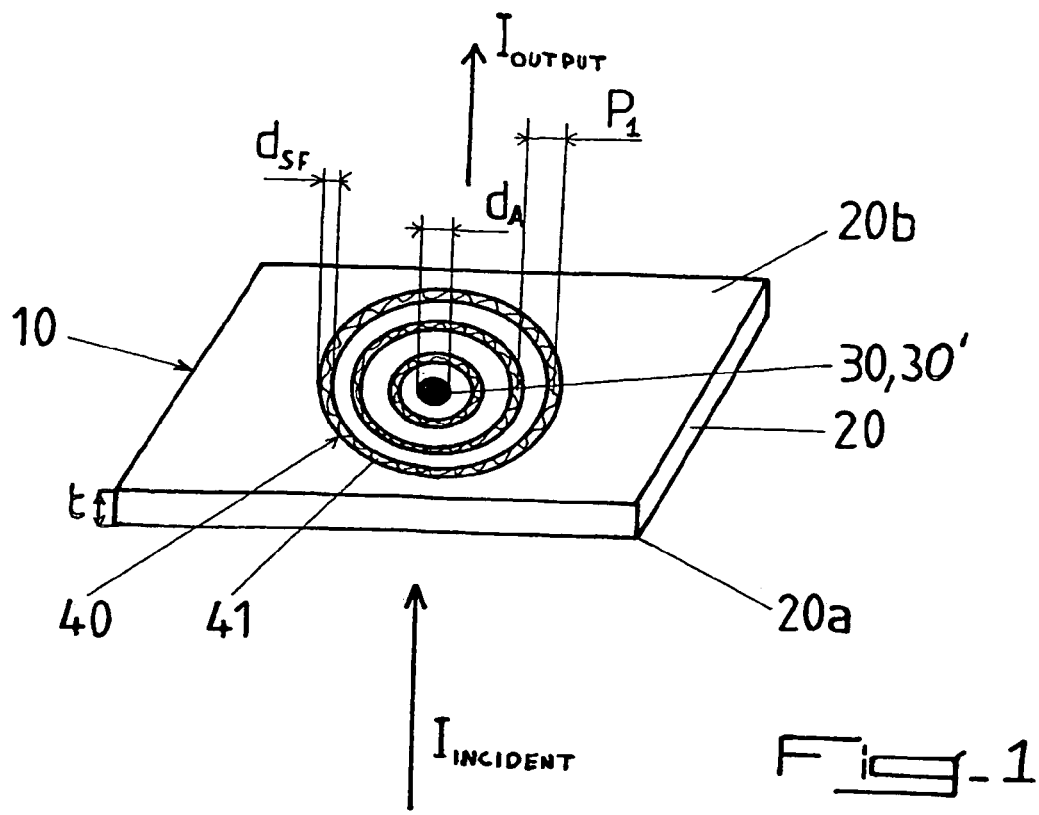
FIG. 1 is a perspective view of an exemplary embodiment of an enhanced light transmission apparatus with divergence and directionality control of the present invention.

Referring now to the enclosed figures, FIGS. 1 to 5 illustrate (not necessarily to scale) several illustrative embodiments of an enhanced light transmission apparatus with directionality and divergence control 10 of the present invention. Generally speaking, said apparatus 10 includes a surface structure in the form of a thin metal plate or thin metal film 20 having a first surface 20a and a second surface 20b. The metal film 20 has at least one aperture or hole 30 with an exit opening 30' provided therein, and at least the surface 20b from which the light exits includes a periodic surface topography as will be described below. Prior to describing particular embodiments of the invention, it will be useful to elaborate upon several terms which are important for understanding the invention.

Metal film 20 forming the surface structure may comprise a metal film or a metal plate. The material comprising metal film 20 may be any conductive material, such as any metal or a doped semiconductor, and is preferably silver, gold, aluminum or chromium.

Hereinafter, the exiting opening 30' is generally the opening of an aperture 30, but the man skilled in the art will understand that it could also be in many cases the opening of a blind hole when no transmission of the light through the surface structure is required and the light source is within said structure.

A surface which includes a periodic surface topography is any surface which exhibits raised and/or depressed regions (as opposed to a substantially smooth or plane surface), wherein such regions are arranged with a periodicity, a quasi-periodic pattern or in a regular repeated pattern in at least (but not limited to) one direction in the plane of the surface (stating at the opening or the aperture). The periodic surface topography may be comprised of one period or a plurality of periods of the pattern. For example, surfaces which exhibit a periodic surface topography may include (but is not limited to) the following: (1) a surface in which a plurality of curved or linear depressed grooves are provided, the grooves being arranged in a periodic pattern on the surface; (2) a surface in which a plurality of curved or linear raised ribs are provided, the ribs being arranged in a periodic pattern on the surface and having various shapes in cross-section; (3) a surface in which a plurality of cylindrical or semi-spherical concave, square or rectangular depressions ("dimples") are provided, the dimples being arranged in a periodic pattern on the surface; (4) a surface in which a plurality of protrusions with cylindrical, square, rectangular or semi-spherical sections are provided, the protrusions being arranged in a periodic pattern on the surface; (5) a surface in which a plurality of depressed or raised rings are provided, the rings being arranged in a periodic pattern in at least one direction on the surface; (6) a surface in which a depressed or raised spiral pattern as a single surface feature is provided and (7) any combination of the above. In general, the periodic surface topography does not include the opening(s) 30' or aperture(s) 30 provided in the metal film 20, although a plurality of such apertures could be provided in a periodic pattern if desired.

To distinguish between apertures 30 (which pass through the entire thickness of the metal film) and protrusions/depressions in a metal film surface, which metal film is otherwise nominally smooth (aside from the apertures), the term "surface feature" will be used to refer to protrusions on the surface and depressions in the surface which do not pass through the entire thickness of the metal film and therefore are not apertures. For example, dimples, semi-spherical protrusions, grooves, rings and ribs are surface features. Surface features may be composed of metal or any other suitable substance. For example, protrusions may be composed of a dielectric material such as a glass which is adjacent or in contact with the metal film 20. Surface features may also be composed a different metal from that of the metal film 20. Surface features may be filled or covered with a material different from the metal of the metal film 20. For instance, surface features such as grooves may be filled with a dielectric material such as glass. Surface features may be fabricated with any desired shape. In addition, the invention is not intended to be limited by any particular dimensions of the surface features. Nevertheless, it is preferable that the width or diameter $d_{SF}$ of a surface feature (that is, the dimension of a surface feature in the direction of periodicity) should be made less than the spatial period P of the surface features. In addition, it is also preferable that the period P of the surface features multiplied by the refractive index $n_d$ of the medium adjacent the metal film should be made less than (and most preferably only slightly less than) the maximum wavelength λ of light which is desired to be transmitted through the metal film. That is, the preferable relationships (which is not intended to limit the invention) between $d_{SF}$, P, $n_d$ λ are: $d_{SF}$<P and $n_d$ P<λ. (Note that if two different media are adjacent the two surfaces of the metal film, $n_d$ preferably corresponds to the smaller of the indices of refraction for the two media). It should also be noted that the invention is effective as long as one surface feature is present next to the aperture. Indeed, the invention is effective with as few as one periodic feature.

FIG. 1 is a perspective view of one exemplary embodiment of the enhanced light transmission apparatus with directionality and divergence control of the present invention. The enhanced light transmission apparatus 10 shown in FIG. 1 includes a metal film 20 having a first surface 20a and a second surface 20b, which includes a periodic surface topography at least on the surface from which the light exits. The second surface 20b is provided with the opening 30' of the single aperture 30 and surface features 40 comprising depressed concentric rings 41. The periodicity in this embodiment is in the radial direction as opposed to the (x, y) periodicity shown in FIGS. 2 to 4. The rings 41 have a width in the direction of periodicity of $d_{SF}$ as shown and are arranged in a periodic pattern (i.e. concentrically with periodically increasing radii) with a period $P_1$. The first surface 20a is provided with the single aperture 30 and may also be provided with a periodic surface topography. For maximum transmission enhancement it is preferred that the first surface 20a is also provided with a periodic surface topography.

Incident light, having an intensity of $I_{incident}$ and symbolically depicted by the arrow at the bottom of FIG. 1, is directed at the first surface 20a of metal film 20 and is transmitted from the opening 30' of the aperture 30 at second surface 20b of metal film 20 as output light having an enhanced intensity of $I_{output}$ and symbolically depicted by the arrow at the top of FIG. 1. The output light will have angular divergence and a directionality which depends on the periodic surface topography on second surface 20b as will be described below.

As shown in FIG. 1, the width of an aperture 30 is denoted as $d_A$. For maximum transmission enhancement and maximum resolution, the width of the aperture(s) is preferably less than the wavelength of light incident on the aperture(s) (that is, the aperture(s) preferably have subwavelength width). The thickness of the metal film 20 is denoted as t, and must be greater than the optical skin depth of the metal film (that is, the metal film should be sufficiently thick so as to be optically opaque), and is preferably in the range of approximately 0,05 to 10 times the aperture width $d_A$.

Figure 2:
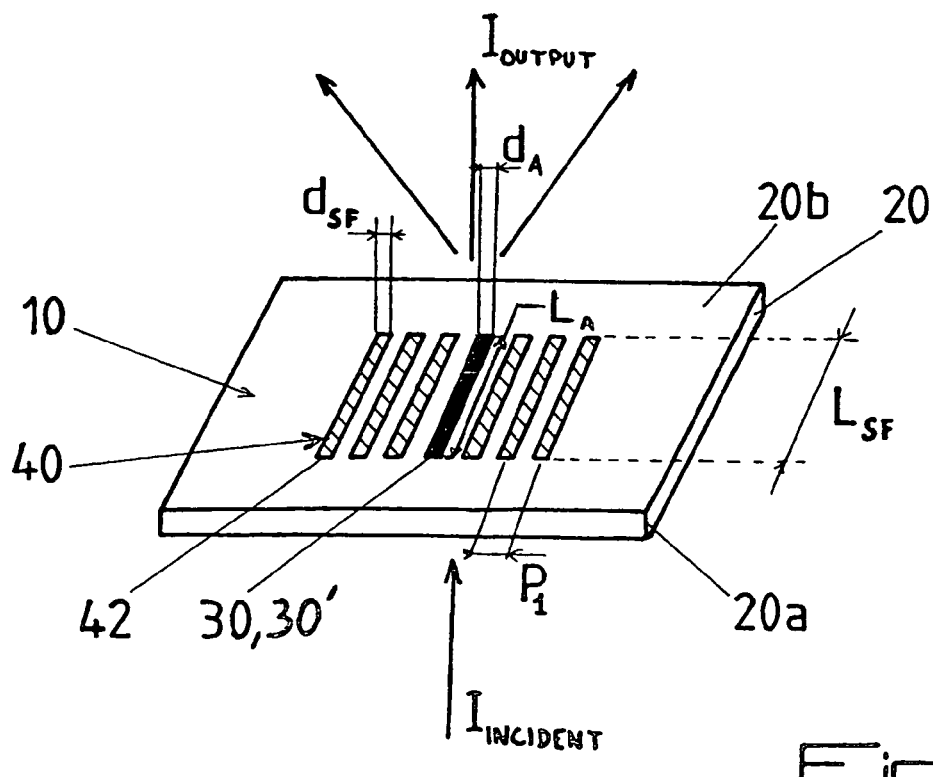
FIG. 2 is a perspective view of an another exemplary embodiment of an enhanced light transmission apparatus with divergence and directionality control of the present invention.

FIG. 2 is a perspective view of another exemplary embodiment of the enhanced light transmission apparatus of the present invention. In this embodiment, the metal film 20 has a single aperture 30 with an exit opening 30' provided therein. The second surface 20b is provided with the single opening 30' and surface features 40 comprising a plurality of depressed grooves 42, the grooves 42 having a width $d_{SF}$ as shown and being arranged in a periodic pattern with a period $P_1$. The length $L_{SF}$ of the grooves 42 and the length $L_A$ of the aperture 30 can be the same or different. Preferably $L_{SF}$ is equal or longer than $L_A$. The first surface 20a is provided with the single aperture 30 and may also be provided with a periodic surface topography. For maximum transmission enhancement it is preferred that the first surface 20a is also provided with a periodic surface topography. The output light will have angular divergence and a directionality which depends on the periodic surface topography on second surface 20b as will be described below.

Figure 3:
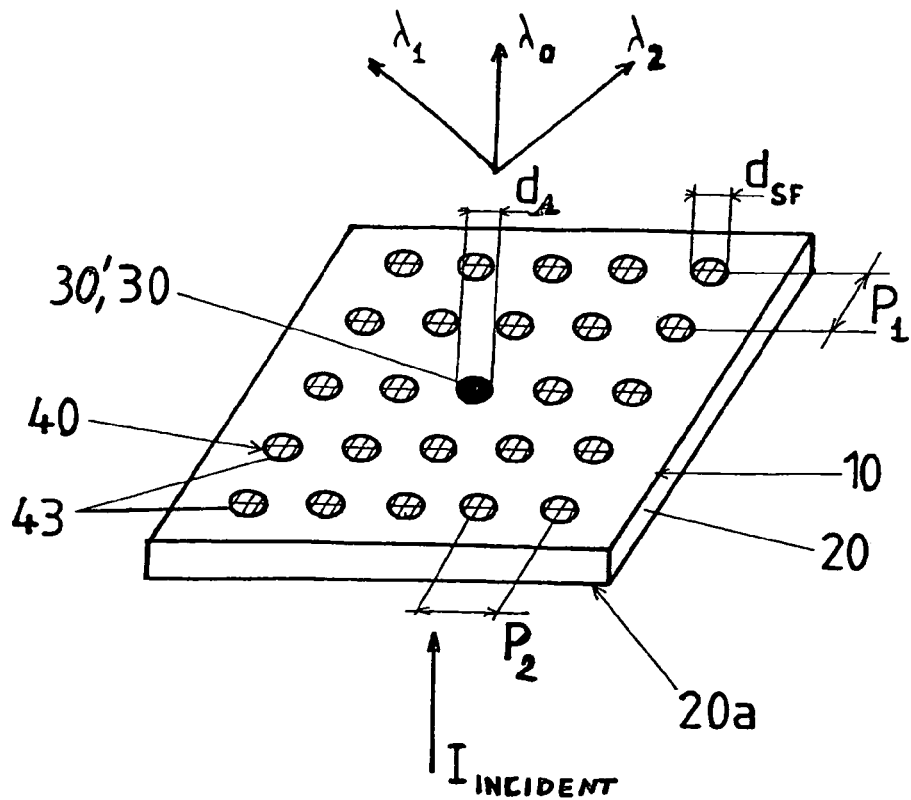
FIG. 3 is a perspective view of yet another exemplary embodiment of an enhanced light transmission apparatus with divergence and directionality control of the present invention.

FIG. 3 is a perspective view of yet another exemplary embodiment of the enhanced light transmission apparatus with directionality and divergence control of the present invention. In this embodiment, the metal film 20 has a single aperture 30 provided therein. The second surface 20b is provided with the opening 30' of the single aperture 30 and surface features 40 comprising a plurality of dimples 43, the dimples 43 having a diameter $d_{SF}$ as shown and being arranged in a periodic pattern with periods $P_1$ and $P_2$. $P_1$ and $P_2$ can be equal or different. The first surface 20a is provided with the single aperture 30 and may also be provided with a periodic surface topography. For maximum transmission enhancement it is preferred that the first surface 20a is also provided with a periodic surface topography. The output light will have angular divergence and a directionality which depends on the surface features 40 on second surface 20b as will be described below.

Figure 4:
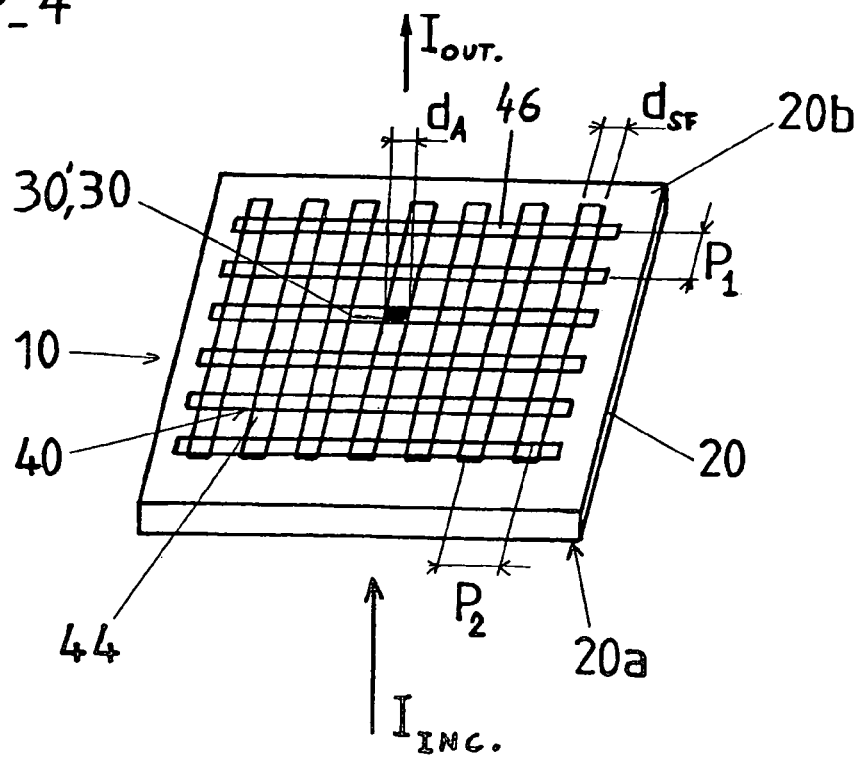
FIG. 4 is a perspective view of yet another exemplary embodiment of an enhanced light transmission apparatus with divergence and directionality control of the present invention.

FIG. 4 is a perspective view of yet another exemplary embodiment of the enhanced light transmission apparatus with directionality and divergence control of the present invention. Once again in this embodiment, the metal film 20 has a single aperture 30 provided therein. The second surface 20b is provided with the opening 30' of the single aperture 30 and surface features 40 comprising depressed grooves 44, the grooves 44 having a width in the direction of periodicity of $d_{SF}$ as shown and being arranged in a periodic pattern (two sets of parallel grooves intersecting with each other at right angles) with periods $P_1$ and $P_2$. $P_1$ and $P_2$ can be equal or different. The horizontal grooves 46 are also shown as having the same width as the vertical grooves 44 in the figure, but this also does not need to be the case. The two sets of parallel grooves also do not need to intersect at right angles, but may instead intersect at other angles. Additionally, the spacing between grooves does not need to be the same in the two sets of parallel grooves. Furthermore, more than two intersecting sets of grooves may be provided. The first surface 20a is provided with the single aperture 30 and may also be provided with a periodic surface topography. For maximum transmission enhancement it is preferred that the first surface 20a is also provided with a periodic surface topography. The output light will have angular divergence and a directionality which depends on the periodic surface topography on second surface 20b as will be described below.

Figure 5:
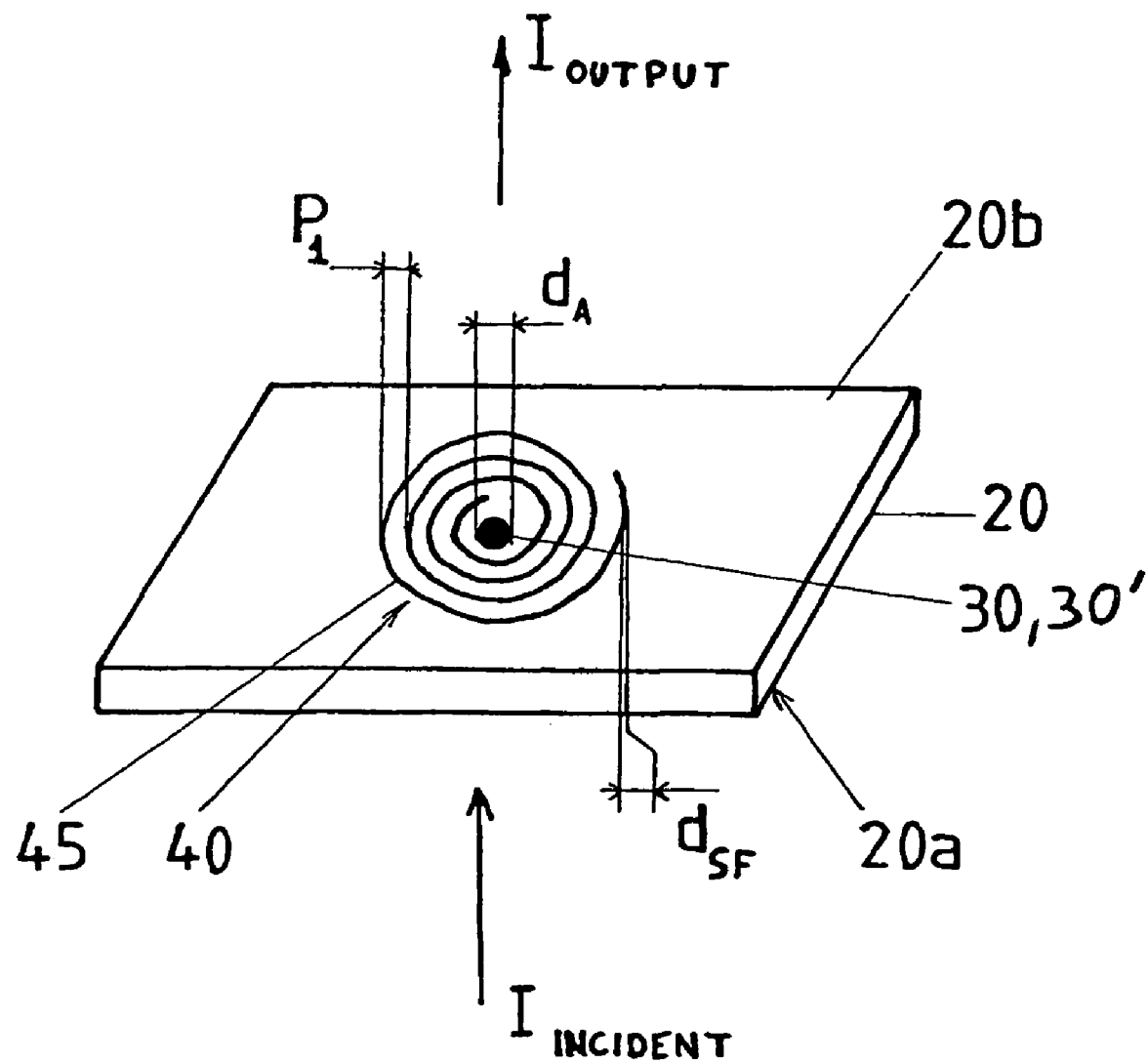
FIG. 5 is a perspective view of yet another exemplary embodiment of an enhanced light transmission apparatus with divergence and directionality control of the present invention.

FIG. 5 is a perspective view of yet another exemplary embodiment of the enhanced light transmission apparatus with directionality and divergence control of the present invention. In this embodiment, the metal film 20 has a single aperture 30 provided therein. The second surface 20b is provided with the opening 30' of the single aperture 30 and surface features 40 (in fact a single surface feature) comprising a spiral topography 45, the body of spiral 45 having a width $d_{SF}$ as shown and being periodic with a period $P_1$ in most directions in the plane of the metal film 20. The first surface 20a is provided with the single aperture 30 and may also be provided with a periodic surface topography. For maximum transmission enhancement it is preferred that the first surface 20a is also provided with a periodic surface topography. The output light will have angular divergence and a directionality which depends on the periodic surface topography 45 on the second surface 20b as will be described below.

In the embodiment of FIGS. 1 to 5, an unsupported surface structure in the form of a thin metal plate 20 is shown (that is, the metal plate 20 is not adjacent to or adhered to a supporting structure). However, a thin metal film 20 fixed to a substrate, such as by depositing the metal film on a glass or quartz, is also contemplated by the present invention. For example, a silver film of thickness t=0,2 μm may be deposited by evaporation on a fused quartz or glass substrate. When a substrate is used, the periodic surface may be provided on either the exposed (air) surface and/or on the surface at the metal film-substrate interface. If the periodic surface topography is provided on the metal surface at the metal film-substrate interface, the surface features may be provided on the metal film by, for example, creating a "negative" of the pattern on the substrate surface and depositing the metal film onto the negatively patterned substrate surface.

Furthermore, while the apertures 30 in the embodiment of FIGS. 1 to 5 and the dimples in the embodiment of FIG. 3 are shown as round or cylindrical or rectangular, these features may have other shapes, such as oval or slit-shaped, without departing from the scope of the invention. Indeed, surface features 40 may include protrusions and/or depressions in the corresponding surface of any size (as long as the width or diameter $d_{SF}$ of the surface feature is less than the period of the surface features) or shape as discussed above. Additionally, while the periodic array shown in the embodiment of FIG. 3 is a square array, other two-dimensional periodic array configurations of apertures and surface features are also possible, such as triangular, pentagonal, hexagonal, . . . , without deviating from the teaching of the invention. Said configurations may also be continuous or discontinuous.

In the embodiments of FIGS. 1 to 5, depressed surface features (e.g. dimples, grooves, and depressed rings) are shown. The invention also encompasses raised surface features as noted above, and raised surface features provided in the periodically arrangements shown in FIGS. 1 to 5 (e.g. raised protrusions, raised ribs, or raised rings) could alternatively be provided. The depth of the depressed features or the height of the raised features are not limited to any specific value. The preferred depth of the depressed features or the height of the raised features are typically larger than the skin depth of the metal and smaller than the wavelength of the transmitted light.

In the embodiments of FIGS. 1 to 5, the surface features are provided at least on the second surface 20b. In the embodiments of the invention with further enhanced transmission, the surface features are provided on both the first surface 20a and the second surface 20b in which case the surface features can be either the same or different on the first and second surfaces. Additionally, the period $P_a$ of surface features on the first surface and the period $P_b$ on the second surface can be equal or different.

Figure 24:
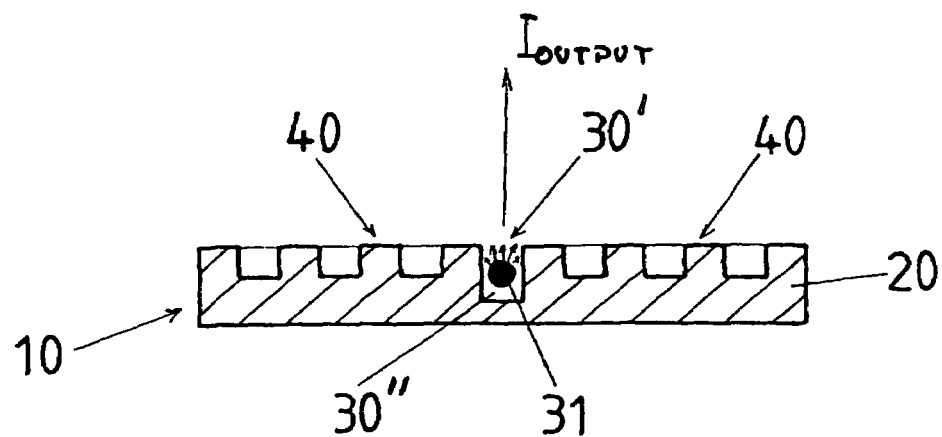
FIGS. 24 and 25 are cross-sectional, schematic views of two apparatuses with surface features similar to the surface features of the apparatus of FIGS. 1 or 2, said apparatus showing an opening of a cavity, a recess or a blind hole according to the first embodiment of the invention, and, FIG. 26 is a schematic sectional view of an apparatus according to the invention with surface features similar to the surface features shown in FIG. 1 or 2, wherein said surface features consist of incrustations of a material having a different refractive index.
Figure 25:
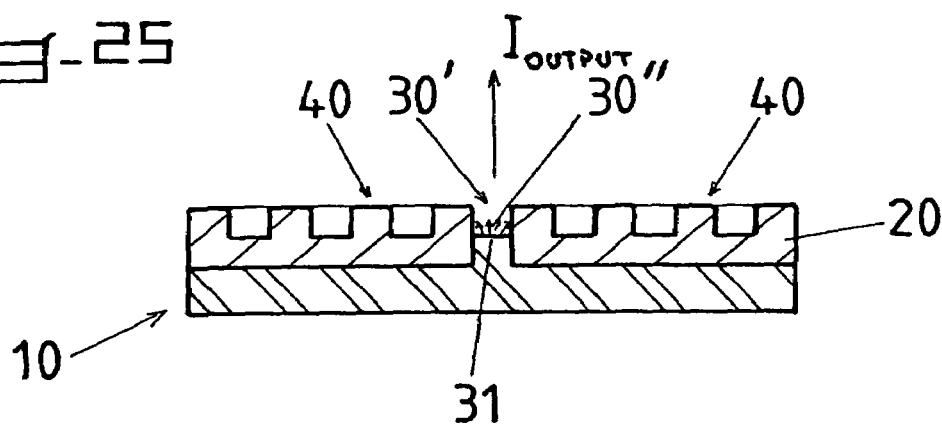
Figure 26:
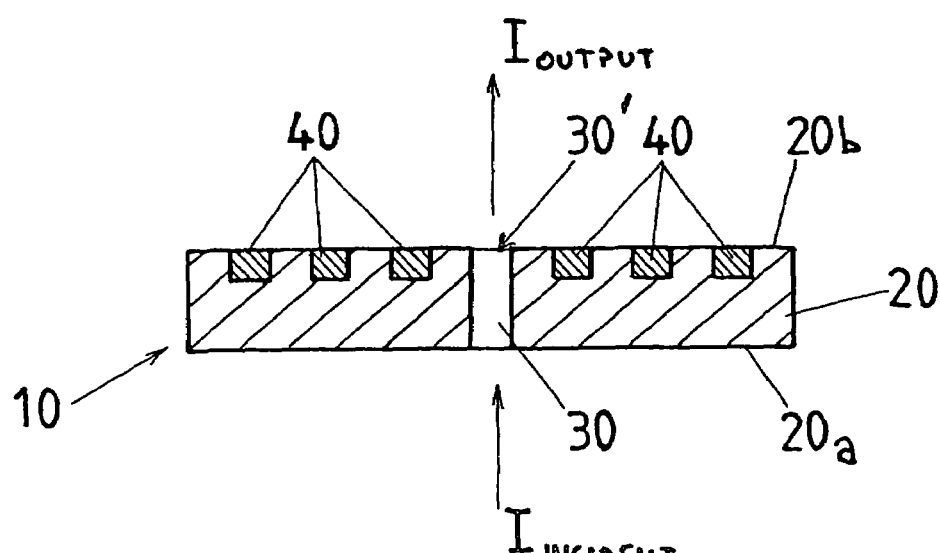

In the embodiments of FIGS. 1 to 5, the aperture is shown in the middle of the surface features. The invention also encompasses apertures located anywhere in the surface features, for instance at the edge of the surface features. The invention also encompasses a plurality of apertures located in the surface features as shown in FIGS. 21 to 23, but preferably less than ten. While the incident light is shown in the embodiments of FIGS. 1 to 5 as being incident on the first surface 20a, the incident light can also come from a light source located inside the aperture 30 (see FIGS. 24 and 25) or a light source located on the surface in the immediate vicinity of the first surface 20a. Preferably, the aperture 30 has a width in one dimension (that is along one axis in the plane of the metal film 20) which is less or equal to 5 times the wavelength to be transmitted through the aperture.

The structured surfaces depicted in FIGS. 1 and 2 have been experimentally fabricated as follows. A suspended metal film comprised of silver, having a thickness of about 300 nm, was prepared by thermally evaporating silver onto a carbon film in a microscope grid. The silver film was optically opaque. The carbon films was removed using a Micrion 9500 Focused Ion Beam machine (50 keV Ga ions, 5 nm nominal spot diameter) to provide the suspended metal film. Apertures and surface features were then fabricated in the metal film using the Micrion 9500 Focused Ion Beam machine. Because the film was suspended, surface features could be fabricated on the first or the second surface of the metal film or on both the first and the second surface of the metal film. The individual aperture dimension $d_A$, and the dimensions of surface features $d_{SF}$ (such as the width of the grooves), were varied between 40 nm and 600 nm among different individual samples. The periodicity of the surface topography was also varied between 0,4 μm and 2,0 μm.

To analyze the operation of the apparatus, the zero-order transmission images and spectra were recorded as follows. Single images and spectra were obtained using a far-field transmission imaging microscope (Nikon TE2000). The image was focused onto the entrance slit of a monochromator (Acton ) and detected with a liquid nitrogen-cooled charge coupled device (CCD, Princeton Instruments) camera. For imaging purposes, the diffraction grating was replaced with a mirror, and the image was projected onto the CCD. Spatial isolation of a single aperture or array along the horizontal axis was achieved using the entrance slit of the spectrometer. The light impinging on the sample surface was a collimated beam kept at normal incidence to the surface while the transmitted light by an individual aperture was collected at various angles using a goniometer.

In order to better understand the operation of the invention, the light transmission properties of other known structures were experimentally realized and compared to the structured surfaces depicted in FIGS. 1 and 2. Thus, FIGS. 6A and 6B illustrate cross-section of metal films with different surface features that were analyzed. FIG. 6A is a cross-section of a metal film with a single aperture 30 and no surface features 40. The angular distribution of the weakly transmitted light is isotropic. In other words, the light radiates in all directions from the aperture as illustrated by the arrows on top in FIG. 6A. This distribution becomes increasingly isotropic as the aperture becomes smaller and is especially isotropic if the aperture is smaller than the wavelength of the transmitted light. If the first surface 20a has a periodic surface feature 40' as illustrated by the cross-sectional view of FIG. 6B but the second surface 20b is essentially smooth, then enhanced light transmission is provided as compared to the bare aperture of FIG. 6A. The enhanced transmission spectrum is as expected from the physical principles which give rise to the enhanced light transmission. See Ghaemi et al., "Surface plasmons enhance optical transmission through subwavelength holes",Physical Review B, Vol. 58, No. 11, pp. 6779–6782 (Sep. 15, 1998). The angular distribution of the transmitted light remains isotropic as in the case of the bare aperture in FIG. 6A, becoming increasingly isotropic as the aperture becomes smaller and, especially so, when the aperture is smaller than the wavelength of the transmitted light.

FIGS. 7A and 7B illustrate the cross-sectional views of the embodiment of the invention depicted in FIG. 2. FIG. 7A illustrates the embodiment where only the second surface 20b is provided with surface features 40 comprising a plurality of depressed grooves 41 surrounding a single aperture 30. The light transmission is enhanced compared to the case of a bare aperture illustrated in FIG. 6A. The enhanced transmission spectrum is as expected from the physical principles which give rise to the enhanced light transmission. See Ghaemi et al., supra. The angular distribution of the transmitted light is anisotropic. The light enhanced transmission spectrum varies as a function of the angle normal to the surface. The enhanced transmitted light travels away from the surface 20b at an angle θ as a function of the wavelength of the transmitted light with an optical divergence α which will discussed below. FIG. 7B illustrates the embodiment of FIG. 2 where both the first surface 20a and the second surface 20b are provided with surfaces features 40', respectively 40 comprising a plurality of depressed grooves 41 surrounding a single aperture 30. The grooves 41 on the first surface 20a have a width $d_{SFa}$, a depth $h_{SFa}$, a length $L_{SFa}$ and a period $P_a$, while the grooves on the second surface 20b have a width $d_{SFb}$, a depth $h_{SFb}$, a length $L_{SFb}$ and a period $P_b$. The aperture has a width $d_A$ and a length $L_A$ (this length is not visible in the cross-sectional diagram of FIG. 7B). The enhanced light transmission is enhanced compared to the case in which the surface features 40' are just on the first surface 20a as illustrated in FIG. 7A. The enhanced transmission spectrum is as expected from the physical principles which give rise to the enhanced light transmission. See Ghaemi et al., supra. The angular distribution of the transmitted light is anisotropic. The light enhanced transmission spectrum varies as a function of the angle normal to the surface. The enhanced transmitted light travels away from the surface 20b at an angle θ as a function of the wavelength of the transmitted light with an optical divergence α which will discussed below.

Figure 8:
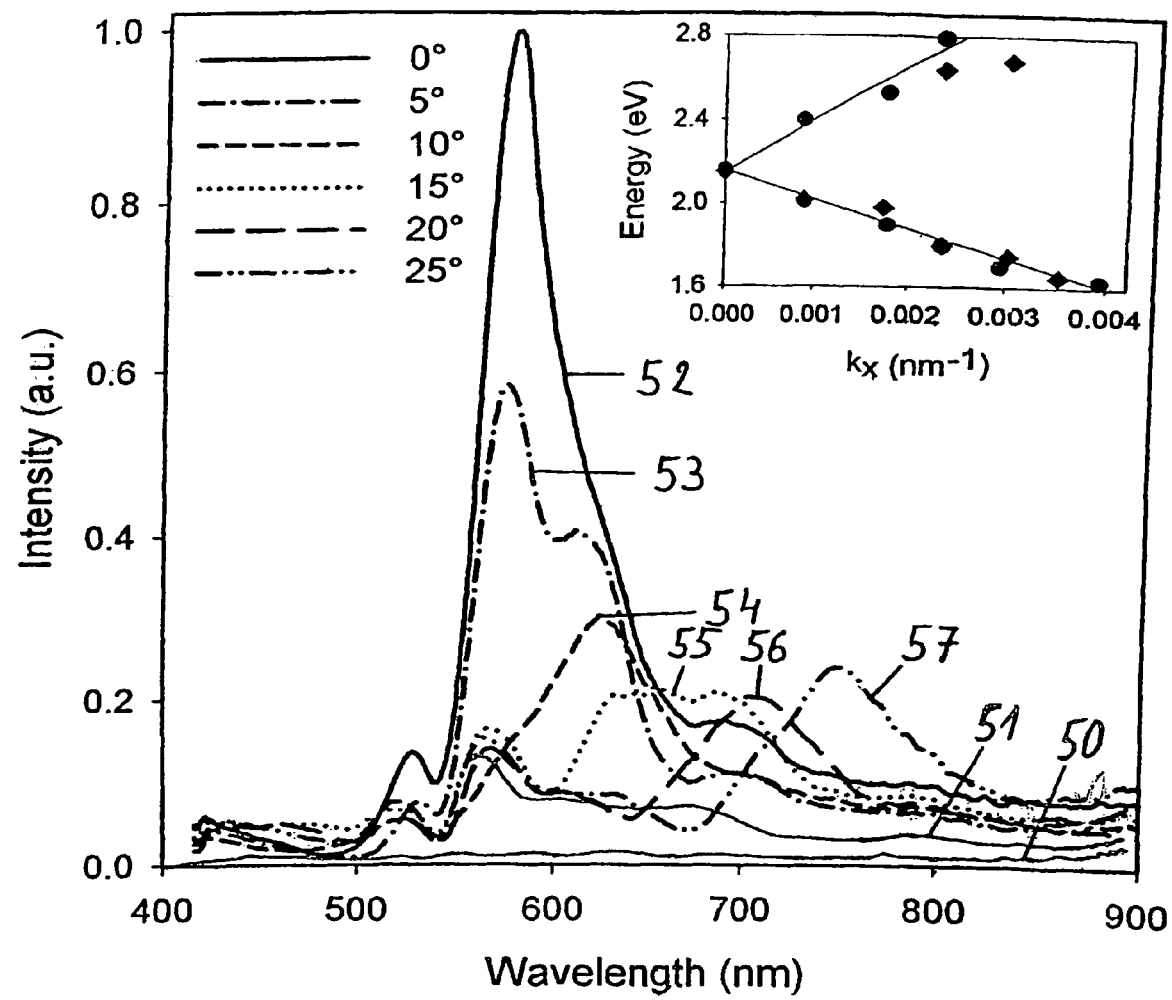
FIG. 8 is a graph showing the transmission of light, as a function of photon energy and the output angle of output light, through a metal film perforated with an aperture, for the case where just second surface includes a periodic surface topography and for the case where both the first and the second is surfaces includes a periodic surface topography for the exemplary embodiment of an enhanced light transmission apparatus with divergence and directionality control of the present invention as shown in FIG. 2; for comparison the graph also shows the transmission of light as a function of photon energy of the output light for a bare aperture as illustrated in FIG. 6A.

These effects are illustrated in FIG. 8. FIG. 8 shows the light transmission spectra for the embodiments of the invention illustrated in FIGS. 6A, 6B and 7B provided in a metal film 20, a suspended Ag film of thickness 350 nm. The transmitted spectrum 50 of a bare aperture 30 ($d_A$=40 nm, $L_A$=4400 nm) which has no surface features 40' or 40 as illustrated in FIG. 6A has no transmission peaks and is very weak compared to the transmitted spectrum 51 of an aperture 30 in a metal film 20 provided with surface features 40' comprising a plurality of depressed grooves 41 ($d_A$=40 nm, $L_A$=4400 nm, $d_{SFb}$=250 nm, $h_{SFb}$=100 nm, $L_{SFb}$=4400 nm, $P_b$=500 nm, number of periods: 20) on the first surface 20a as illustrated in FIG. 6B. The spectrum 51 of the enhanced light transmission is as expected from the physical principles which give rise to the enhanced light transmission. See Ghaemi et al., supra. Spectra 50 and 51 do not vary with the collection angle θ at which they are collected demonstrating the isotropic distribution of the light exiting ($I_{output}$) from the structure illustrated in FIGS. 6A and 6B.

Figure 9:
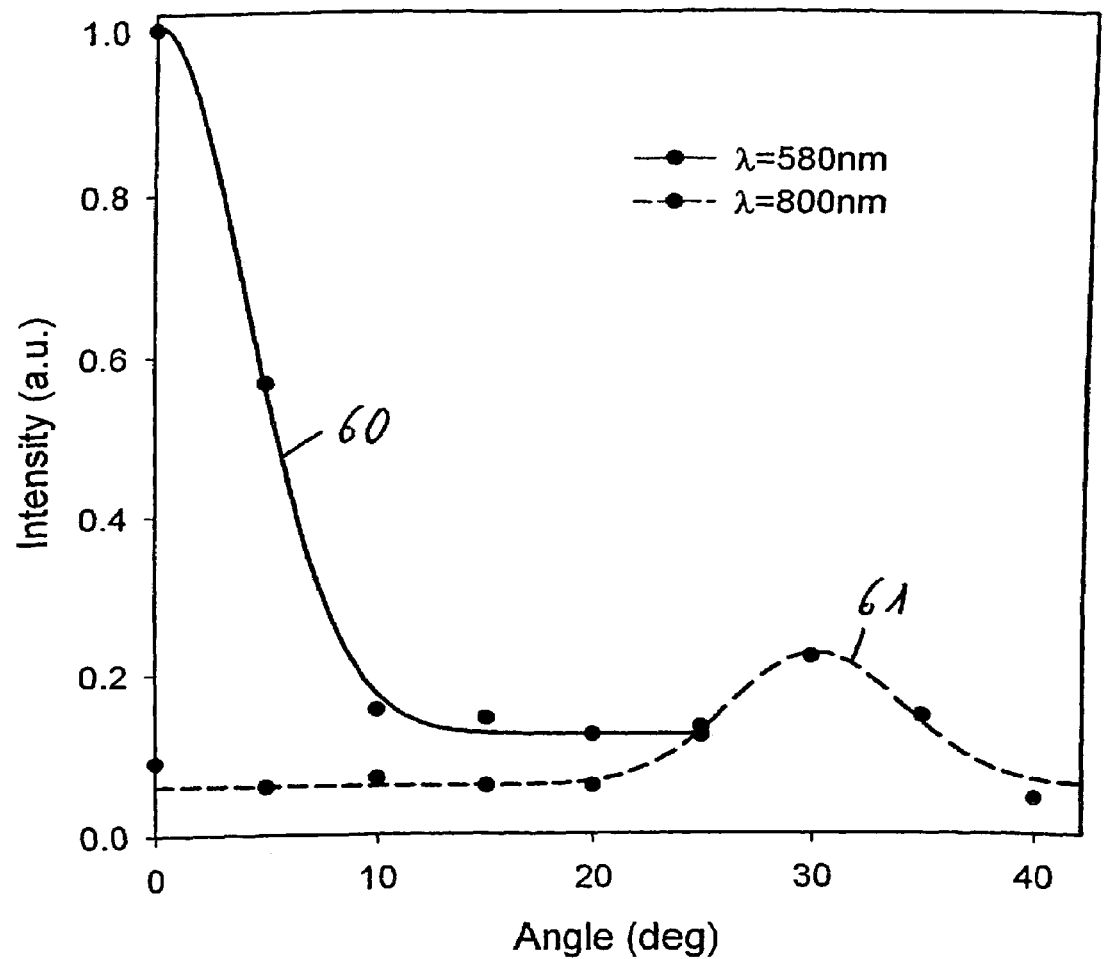
FIG. 9 is a graph showing the intensity of the output light for two different wavelengths as a function of output angle determined from the data presented in FIG. 8 for the exemplary embodiment of an enhanced light transmission apparatus with divergence and directionality control of the present invention shown in FIG. 2.

Spectra 52 through 57 in FIG. 8 are those recorded experimentally of an aperture 30 in a metal film 20 provided with surface features 40 comprising a plurality of depressed grooves 41 ($d_A$=40 nm, $L_A$=4400 nm, $d_{SFa}$=$d_{SFb}$=250 nm, $h_{SFa}$=$h_{SFb}$=100 nm, $L_{SFa}$=$L_{SFb}$=4400 nm, $P_a$=$P_b$=500 nm, number of periods on surfaces 20A and 20B: 20) on both the first surface 20a and the second surface 20b as illustrated in FIG. 7B. First it can be noted that the enhanced light transmission spectrum 52 recorded at θ=0° (normal to the surface) is much enhanced compared spectrum 51 corresponding to the case where the surface features 40 are just on the first surface 20a. Secondly, it can be noted that as the collection angle θ at which the spectrum is recorded is varied between 0° and 25°, the spectrum changes significantly. If the transmitted light is plotted at a given wavelength as a function of the collection angle θ, it provides the optical divergence α a of the transmitted light. FIG. 9 provides two such plots for the light transmitted at 580 nm (curve 60) and at 800 nm (curve 61) for the data (spectra 52 through 57) in FIG. 8 and the value of α is measured to be ±5°. Taking into account the angular resolution of our measurement apparatus this correspond to a true optical divergence of ±3°.

Figure 10:
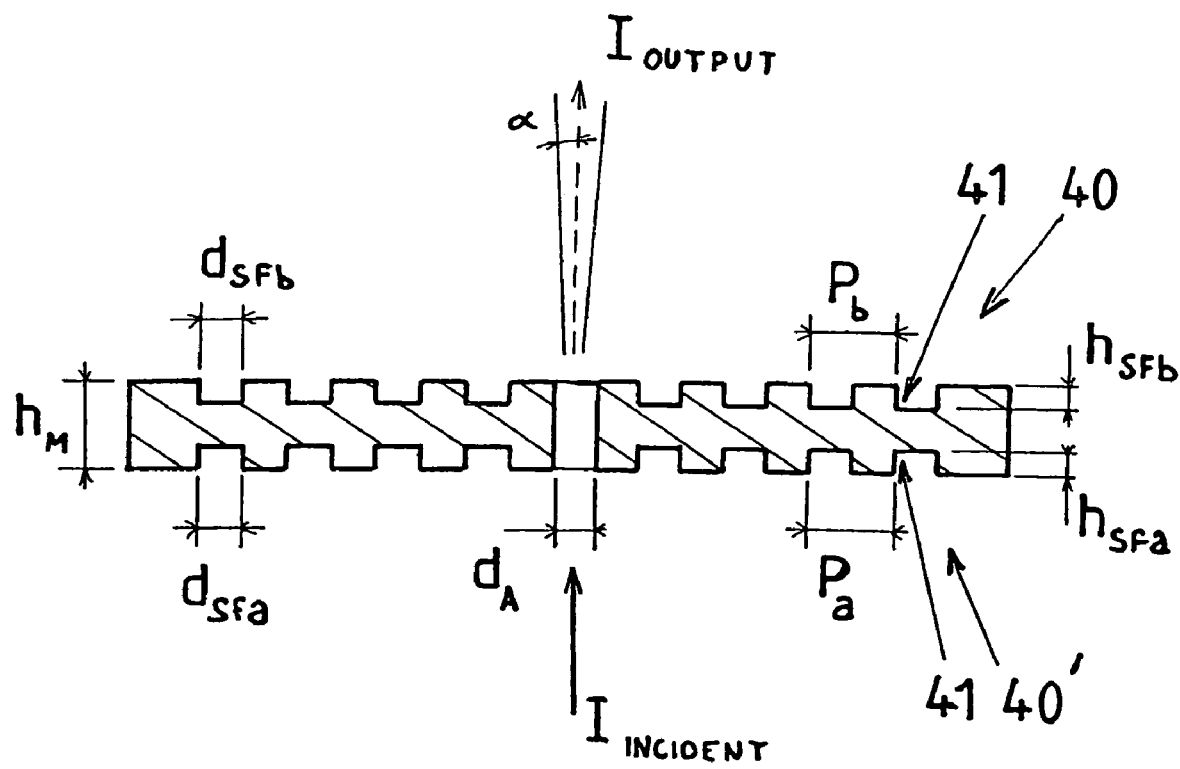
FIG. 10 is a cross-sectional view of an aperture provided in a metal film wherein both the first surface and the second surface include a periodic surface topography for the exemplary embodiment of an enhanced light transmission apparatus with divergence and directionality control of the present invention shown in FIG. 1.

FIG. 10 illustrates the cross-sectional views of the embodiment of the invention depicted in FIG. 1. FIG. 10 illustrates specifically the case of the embodiment where both the second surface 20b and the first surface 20a are provided with surface features 40, respectively 40' comprising depressed concentric rings 41 surrounding a single aperture 30. The enhanced light transmission is enhanced ten fold as compared to the case where only the second surface 20b is provided with surface features 40 comprising depressed concentric rings 41 surrounding the exit opening 30' of a single aperture 30. The enhanced transmission spectrum is as expected from the physical principles which give rise to the enhanced light transmission. See Ghaemi et al., supra. The angular distribution of the transmitted light is anisotropic. The light enhanced transmission spectrum varies as a function of the angle normal to the surface. The enhanced transmitted light travels away from the surface 20b at an angle θ (in this embodiment θ is 0°, e.g. normal to the surface of the metal film 20) with an optical divergence a which will discussed below.

Figure 11:
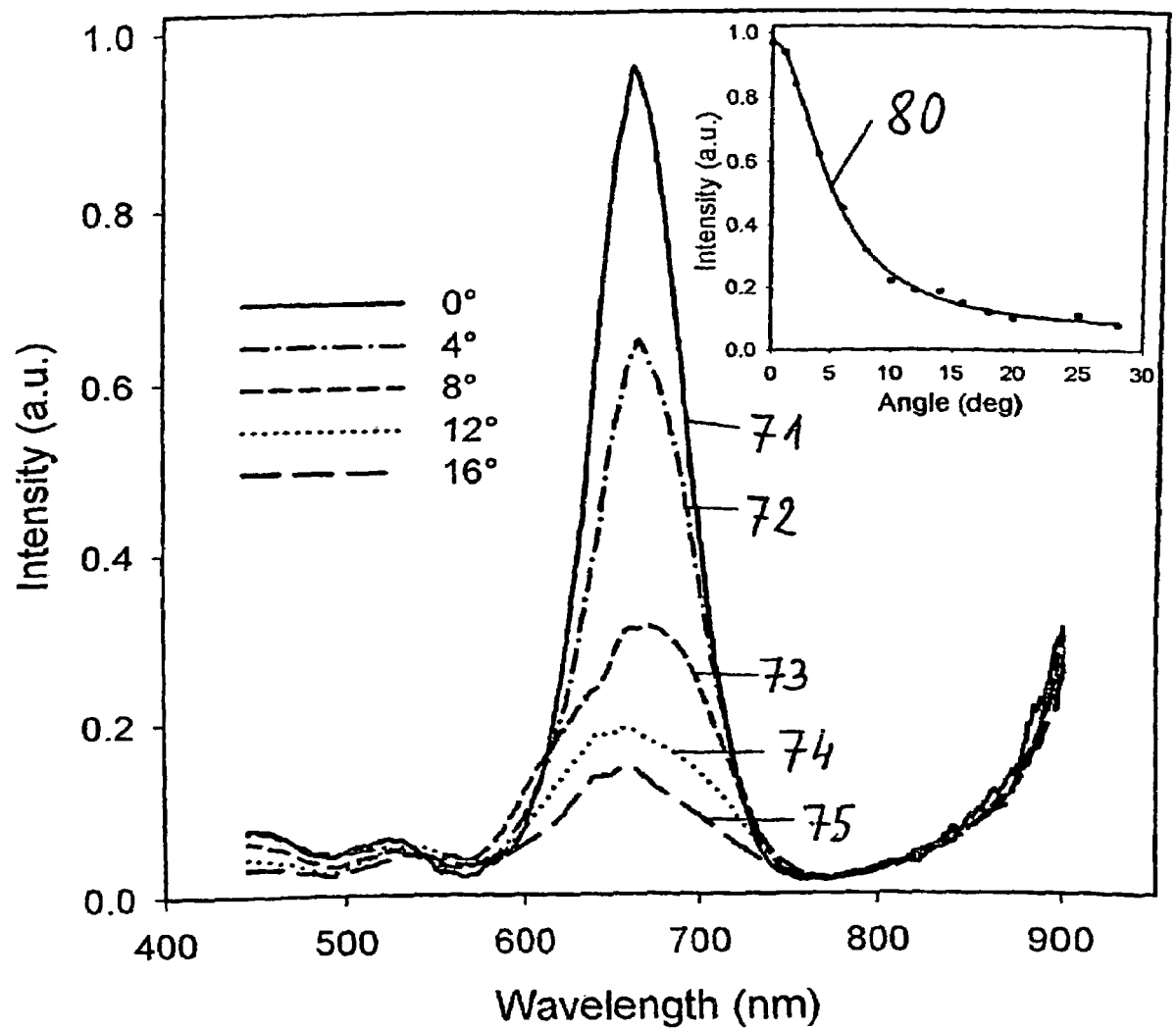
FIG. 11 is a graph showing the transmission of light, as a function of photon energy and the output angle of output light, through a metal film perforated with an aperture, for the case where both the first and the second surfaces includes a periodic surface topography for the exemplary embodiment of an enhanced light transmission apparatus with divergence and directionality control of the present invention shown in FIG. 1; the insert is a graph of the intensity of the output light at a given wavelength as a function of output angle determined from the data presented in FIG. 10 for the exemplary embodiment of an enhanced light transmission apparatus with divergence and directionality control of the present invention shown in FIG. 1.

These effects are illustrated in FIG. 11. FIG. 11 shows the experimentally recorded light transmission spectra at various collection angles for the embodiment of FIG. 1 specifically in the case of the embodiment where both the second surface 20b and the first surface 20a are provided with surface features 40, respectively 40' comprising depressed concentric rings 41 surrounding a single cylindrical aperture 30 ($d_A$=300 nm, $d_{SFa}$=$d_{SFb}$=300 nm, $h_{SFa}$=$h_{SFb}$=100 nm, $P_a$=$P_b$=600 nm, number of depressed concentric rings: 4) in a suspended metal film 20 (Ag, thickness 300 nm). FIG. 11 provides five spectra (71 through 75) recorded at 0°, 4°, 8°, 12° and 16° respectively which show that the enhanced light transmission spectrum varies as a function of collection angle θ. If the transmitted light is plotted at a given wavelength as a function of the collection angle θ, it provides the optical divergence α of the transmitted light. The insert in FIG. 11 provides such a plot for the light transmitted at 660 nm (curve 80) for the data (i.e. spectra 71 through 75) and the value of α is measured to be ±5°. Taking into account the angular resolution of our measurement apparatus this correspond to a true optical divergence of ±3°.

The inventors have found that, in addition to the angular distribution of the transmitted light and the small optical divergence, the light is reradiated from a surprisingly small area from the second surface 20b of the invention when considering the measured optical divergence. This effect is illustrated in the FIG. 12. The scanning electron microscope images of FIGS. 12A and 12B shows the second surface 20b of the exemplary embodiments illustrated in FIGS. 1 and 2 respectively. FIGS. 12C and 12D show optical images of the area of the corresponding surfaces 20b of FIGS. 12A and 12B respectively when light is incident on the first surfaces 20a. All the four images of FIG. 12 are taken at the same scale. It can be noticed that the reradiating area is very small compared to the corresponding area of the surface features 40 in both embodiments. The width of reradiating area is less than 1000 nm and thus comparable to the wavelength of visible light that is transmitted.

It is well know in the field of optics, that the smaller the area of a light source the larger the optical divergence will be. For instance to obtain the optical divergence of ±3° found experimentally for the embodiments described in FIGS. 8 and 11, would normally require a light source having a width of 4 900 nm which is much wider than that observed experimentally and illustrated in FIGS. 12C and 12D. The physical principles which give rise to the small optical divergence with the small reradiating area will be explained below.

The physical principles which give rise to enhanced light transmission through a metal film, provided with a periodic surface topography and perforated with one or more apertures has been discussed and explained in detail previously. See U.S. Pat. No. 6,236,033 to Ebbesen et al.; Ghaemi et al., supra.

The physical principles that give rise to the small optical divergence and the directionality of the transmitted light of the apparatus 10 of the present invention can be understood by the inventors as follows. The light that is transmitted through the aperture 30 exits surface waves on the second surface 20b due to the presence of surface features 40 on the second surface 20b. The surface waves then couple back to light by scattering off the surface features 40. The amount of scattering decreases rapidly with distance from the aperture 30 and as a result the reradiation from the second surface 20b of the apparatus 10 is mainly confined to a small area near the aperture 30. The small optical divergence is due to interference in the immediate vicinity of the second surface 20b between the scattered light and the light emerging from the aperture 30 from the second surface 20b.

The coupling of surface plasmons back to light on the second surface 20b follows the dispersion relation imposed by the periodicity of the surface features 40 surrounding the aperture on the second surface 20b in order to allow for energy and momentum conservation. In effect, the combination of the periodic structure momentum G ($=2\pi/P_b$) and the surface wave momentum $k_w$ on the second surface 20b acts like a k-vector filter on the reradiated light of wavelength $\lambda$ (with momentum $k_{out}=2\pi/\lambda$) defining the permitted directionality or angle $\theta$ for the reradiated light following approximately the equality:

$$\theta = \sin^{-1}((\lambda/2\pi)(k_w \pm G)) \tag{1}$$

The validity of this understanding of the physical principles that give rise to the directionality of the beam of light transmitted by the apparatus 10 is confirmed by the agreement between the dispersion relation of the periodic surface features 40 of the apparatus 10 and the directionality of the transmitted light as found experimentally by the inventors and shown in the insert of FIG. 8 for the embodiment of the invention illustrated in FIG. 2. In the insert in FIG. 8 the dots and the diamonds show the dispersion curve and the directionality respectively of the transmitted light recorded experimentally of an aperture 30 in a metal film 20 provided with surface features 40, 40' comprising a plurality of depressed grooves 41 ($d_A$=40 nm, $L_A$=4400 nm, $d_{SFa}=d_{SFb}$=250 nm, $h_{SFa}=h_{SFb}$=100 nm, $L_{SFa}=L_{SFb}$=4400 nm, $P_a=P_b$=500 nm, number of periods on surfaces 20a and 20b: 20) on both the first surface 20a and the second surface 20b.

Figure 13:
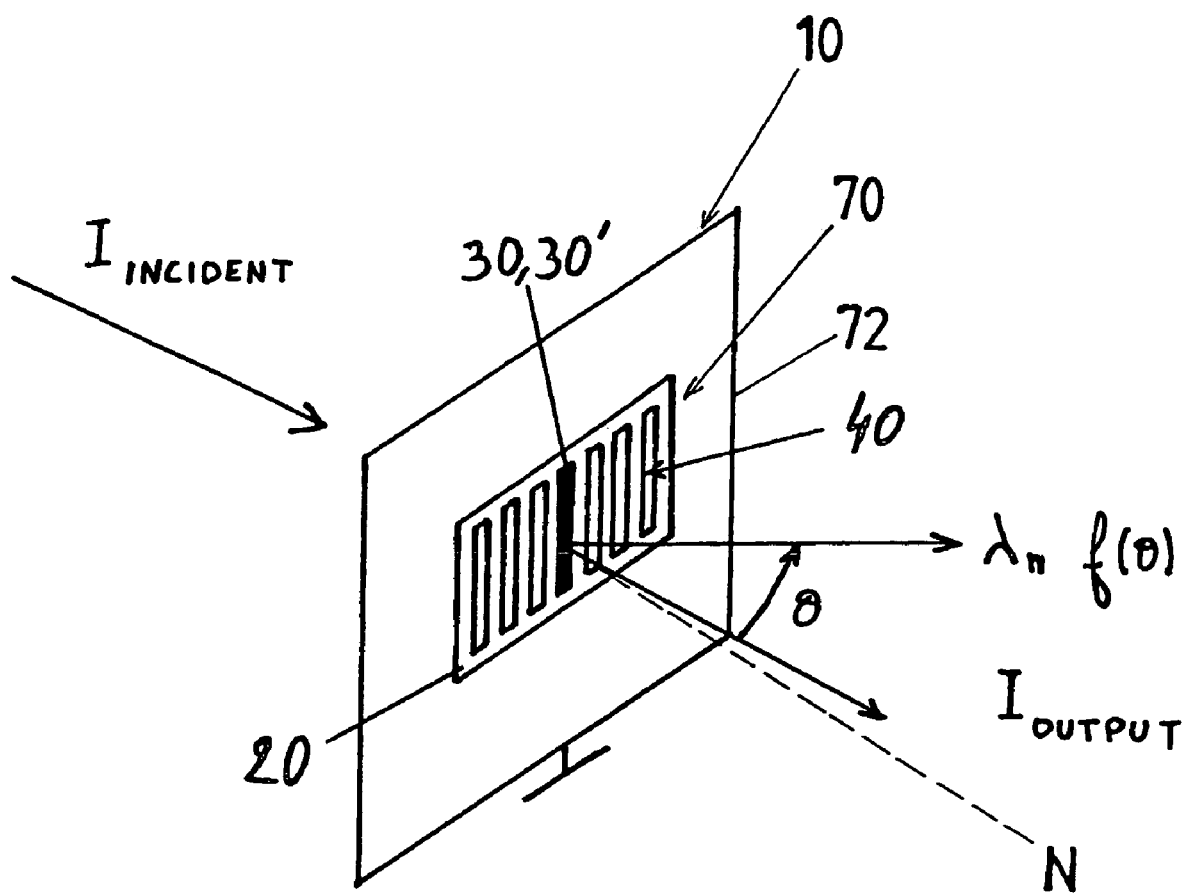
FIG. 13 is a perspective, schematic diagram illustrating an apparatus which selectively varies the transmission of light according to the output angle of the light, such a device being effective as an angular wavelength-selective optical filter.

As discussed above, for a given angle of the incident beam a surface structure such as a metal film 20 having one or more apertures 30 and corresponding exit opening 30' and at least the second surface 20b exhibiting a periodic surface topography provides a transmitted beam of light with the low optical divergence and in addition provides an enhanced transmission spectrum which depends on the angle $\theta$ of the output light. This angular dependence effect results in a novel wavelength-selective optical filter 70 as shown in FIG. 13 which disperses the incident light $I_{incident}$ into different directions according to wavelength of the output light $I_{output}$. The behavior of this filter 70 is very much like that of a prism which disperses light in different directions according to wavelength $\lambda$. An enhanced light transmission apparatus with directionality and divergence control 10, constructed as described above, is preferably mounted to a support 72, such as a substrate or an optical fiber. Dashed line N represents a line normal to the surface of optical filter 70, and the angle of light output of the optical filter 70 is denoted by angle $\theta$ with respect to the normal N. The wavelength at which the light transmission peaks as a function of the angle is selectively variable as shown in FIGS. 8 and 11. In FIG. 13, the incident light $I_{incident}$ is shown impinging on the surface normal to the surface, the invention also encompasses the incident light $I_{incident}$ impinging at any angle on the incident surface. The invention also encompasses a plurality of incident light beams impinging on the first surface at the same or at different angles and exiting from the second surface at the same or at different angles. By using this property, an optical filter comprising a metal film with one or more apertures and having at least a periodic surface topography on the second surface can be formed. The wavelengths of light transmitted through the filter are also varied and are selectable based on the output angle.

This wavelength-selective optical filter can be used for ultraviolet, visible and longer wavelengths. The advantage of this arrangement is that the wavelength of the output light varies with the angle normal to the output surface even if all the wavelengths of the incident light are colinear (i.e. arriving with the same angle on the incident surface). This property is a clearly distinguishing property from the prior art. In particular, the wavelength-selective filters described in U.S. Pat. No. 6,236,033 to Ebbesen et al provide a filter where the output light is always colinear with the input light independent of the wavelength of the transmitted light.

The enhanced light transmission apparatus with divergence and directionality control of the present invention, having both one or more apertures and at least a periodic surface topography on the second surface, exhibit improved wavelength selectivity as optical filters in comparison to conventional mesh arrays (that is, sparse meshes or wire arrays used as filters in the infrared or microwave regions; see R. Ulrich, "Far-Infrared Properties Of Metallic Mesh And Its Complimentary Structure",Infrared Physics, Vol. 7, pp. 37–55 (1967), and L. C. Botten et al., "Inductive Grids In The Resonant Region: Theory And Experiment", International Journal of Infrared and Millimeter Waves, Vol. 6, No. 7, pp. 511–575 (1985)). In addition, the output light in the conventional mesh array filters is always colinear with the input light independent of the wavelength of the transmitted light. Moreover, unlike photonic band gap arrays where the material is passive and translucent at all wavelengths except at the energies within the gap, the present invention provides a material that is opaque at all wavelengths except those for which coupling occurs with surface waves or surface plasmons. This represents a practical advantage in shielding out stray light.

Figure 14B:
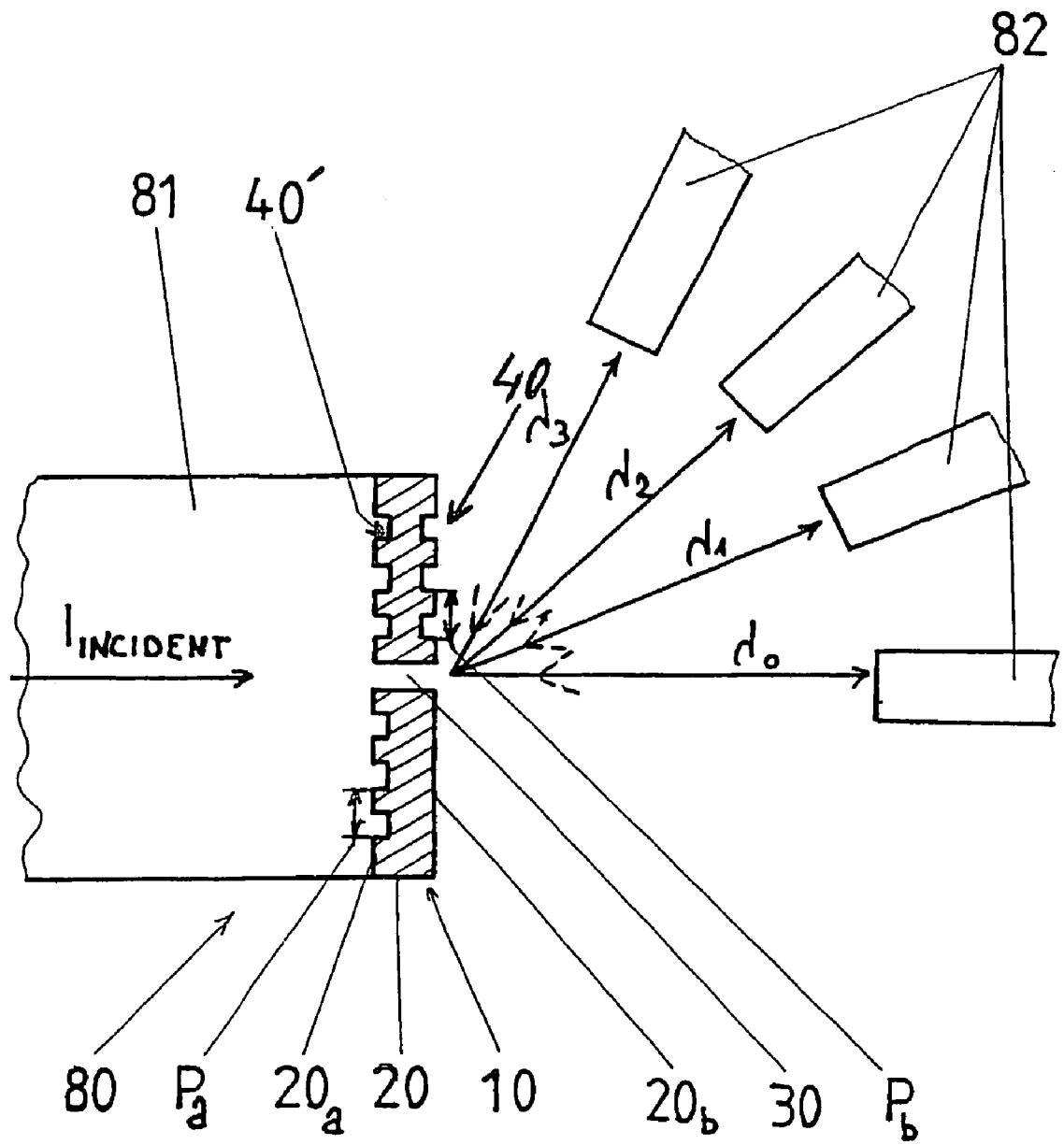
FIG. 14B is a cross sectional, schematic diagram of a variant of the light beam multiplexer of the present invention.

Another application of the invention is as a light beam multiplexer 80 as shown in cross-section in FIGS. 14A and 14B. Light (indicated by the arrow labeled $I_{incident}$) is incident on an enhanced light transmission apparatus with optical divergence and directionality control 10. The apparatus 10 includes a metal film 20 which may be (but not limited to being) deposited on a substrate 81. The metal film 20 is provided with an aperture 30, and the metal film 20 has periodically arranged surface features 40 provided on at least the second surface 20b, preferably also surface features 40' on first surface 20a. In this multiplexer, the transmitted light is redirected at different angles according to wavelength $\lambda$ towards different light collecting devices 82. The light collectiving devices can be (but limited to being) optical fibers, lenses, mirrors and light detectors. The period $P_a$ of surface features 40' of the first surface 20a and the period $P_b$ of the surface features 40 of the second surface 20b can be equal or different. Alternatively, the aperture 30 can be located at one end of the periodic surface 40 on the second surface 20b as shown in FIG. 14B. In FIGS. 14A and 14B the apparatus 10 is shown with a single aperture 30 but a plurality of apertures may also be provided in the metal film depending on the number and the type of light collecting devices 82 without deviating from the invention. Although not shown in FIGS. 14A and 14B, the invention also encompasses the reverse optical process by which light travels in the reverse direction to that shown in FIGS. 14A and 14B. In that case, the output light from devices 82 arriving at different angles on the enhanced light transmission apparatus with optical divergence and directionality control 10 are redirected into a beam on the opposite side of incidence, i.e. the side corresponding to first surface 20a.

Previously, it was difficult to direct light from a small aperture in particular when the aperture had a subwavelength dimension. Complex lenses and alignment devices were used to direct the light. The advantage of the present invention is that the transmitted light is directed according to wavelength and with a small optical divergence. As a result redirecting light at the exit of a small aperture is made efficient.

Figure 15:
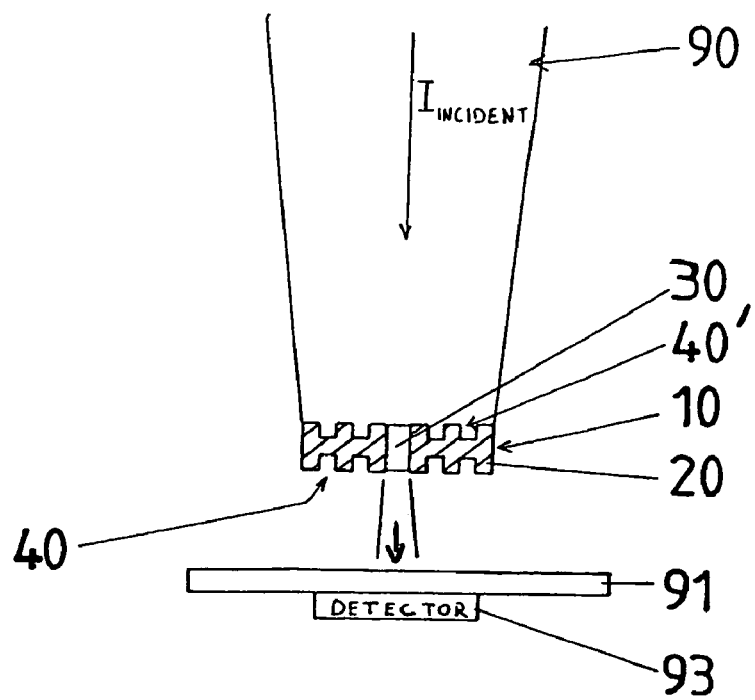
FIG. 15 is a perspective schematic diagram of a near-field scanning optical microscope probe of the present invention, the probe being operated in an emission mode.

Another application for the invention is in near-field scanning optical microscopy ("NSOM"). FIG. 15 shows an embodiment of the near-field scanning optical microscope probe of the present invention, in which the probe acts as a light source (emission mode). Light is directed into the probe 90 toward a first surface 20a. The light couples with the periodic array of surface features 40' on the first surface 20a. The light is then transmitted via the single subwavelength-diameter aperture 30 to the second surface 20b which is also provided with surface features 40, the light is then directed with a small optical divergence through the specimen 91, to a photodetector 93 for conventional signal processing. The inclusion of surface features 40 and 40' on both the first and the second surface of the metal film 20 according to this invention enhances the intensity of light transmitted from the probe 90 into the specimen 91 for subsequent collection at photodetector 93.

The resolution of the NSOM is determined by the size of the aperture, so the smaller the aperture the better the resolution. However, in practice, there is a practical limit to the resolution achievable because the transmission of a subwavelength-diameter aperture decreases as $(d/\lambda)^4$ which results in very low intensity signals. See H. A. Bethe, "Theory of Diffraction of Small Holes" The Physical Review, vol. 66, pp. 163–182 (October 1944). To overcome this limitation, surface plasmon enhanced light transmission probes for NSOMs with surface topography on just one side of the metal film have been described in the prior art. See U.S. Pat. No. 6,236,033 to Ebbesen et al. The advantage of the present invention over the prior art is that the intensity of the light reaching the specimen is increased both by the presence of periodic surface topography on the first and second surfaces, which leads to enhancement of the enhanced transmission as shown in FIG. 8, and by the small optical divergence provided by the surface topography on the second surface (output surface) which focuses the transmitted light on the specimen.

Figure 16:
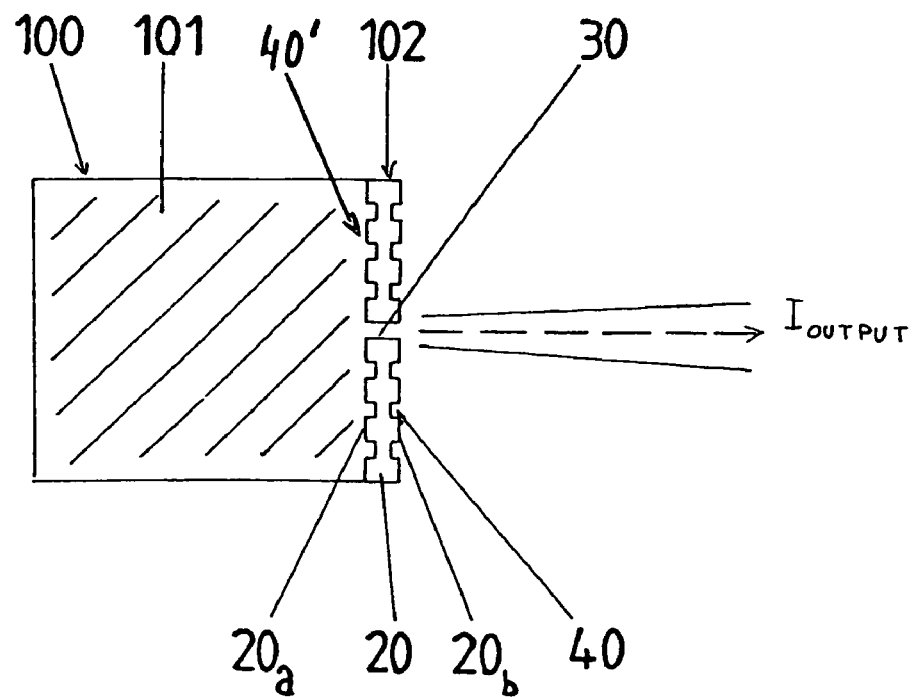
FIG. 16 is a cross-sectional, schematic diagram of a bright subwavelength light source of the present invention.

Another application for the invention is in bright subwavelength light sources. FIG. 16 shows a bright subwavelength light source device 100 constructed in accordance with the present invention. The source 101 which in the preferred embodiment is laser or a light emitting diode has an output surface 102 consisting of a surface structure 20 in which an aperture 30 allows the light to be coupled out with extremely high efficiency with well defined directionality and low optical divergence. The periodicity of the surface features 40' on the first surface 20a should be chosen so that it matches the wavelength of the source to provide maximum coupling with said surface features 40' and transmission through the aperture 30. See Ghaemi et al., supra. The periodicity of the surface features 40 on the second surface 20b should be chosen to increase the enhanced transmission provided by the first surface 20a and to direct the output light beam in a desired direction with low optical divergence. In the prior art, a subwavelength light source is achieved by providing a subwavelength aperture in the path of the output of the light source. As discussed above, the subwavelength aperture then diffracts light in all directions and the transmitted light intensity is very weak. See Bethe, supra. The advantages of this invention over the prior art is that the output light transmitted by the aperture in the invention is oriented in a definite direction with a low optical divergence and the transmitted light is strongly enhanced.

Figure 18A:
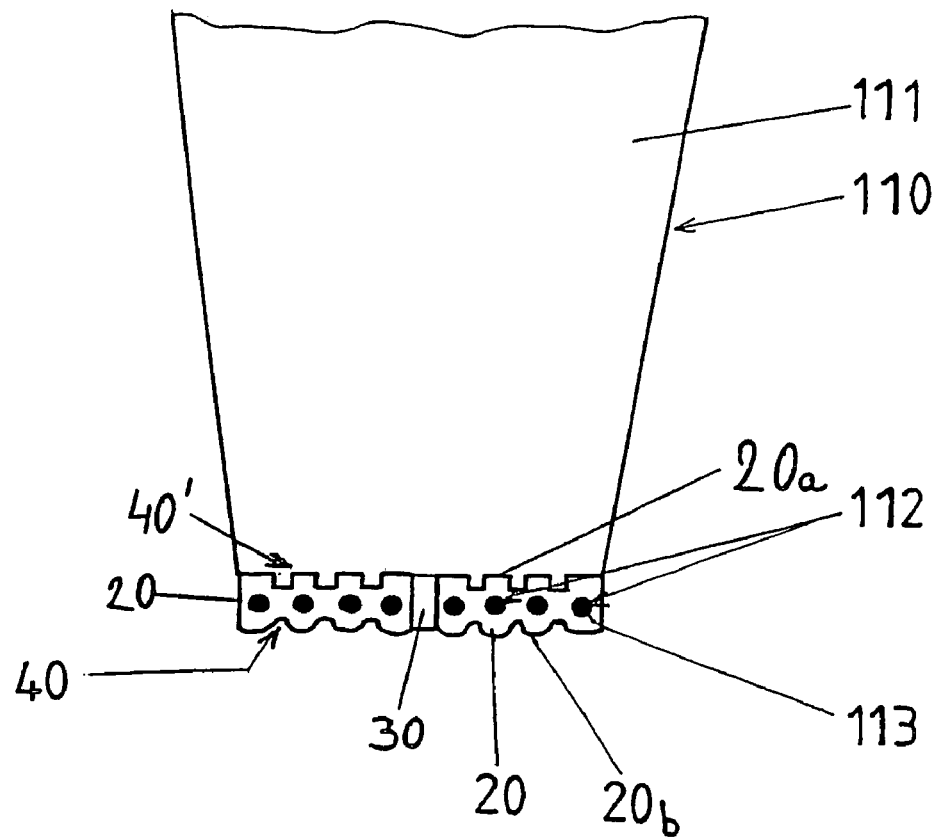
FIG. 18A is a cross-sectional, schematic diagram (not necessarily to scale) of a read/write head with a wire coil of the present invention.
Figure 18B:
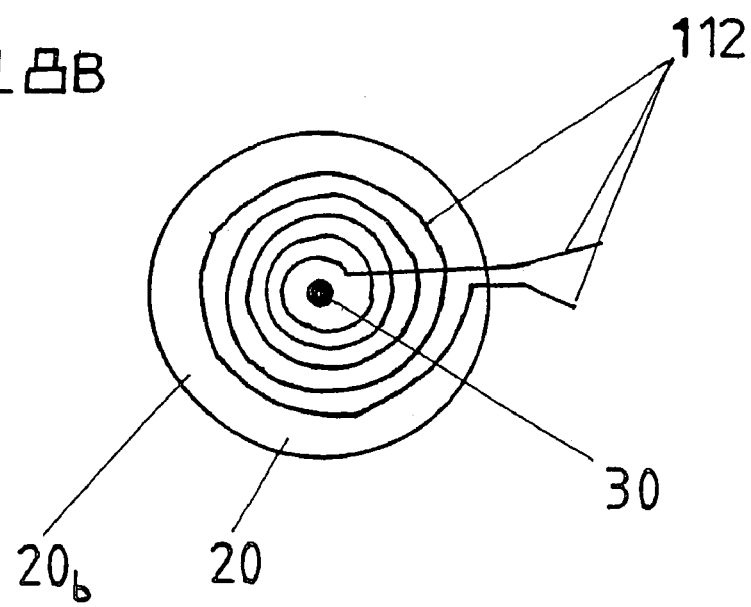
FIG. 18B is a plan view of the tip of the read/write head of FIG. 18A showing the coiled wire providing a periodic surface topography in accordance with the exemplary embodiment of an enhanced light transmission apparatus with divergence and directionality control of the present invention shown in FIG. 5.

Another application for the invention is in read/write heads for optical data storage. FIGS. 17 and 18 show embodiments of read/write head for reading to and/or reading from optical storage media of the present invention. The read/write heads 110 shown in FIGS. 17A and 17B include an enhanced light transmission apparatus with optical divergence and directionality control 10 constructed at the end of a waveguide 111 such as (but not limited to) an optical fiber. The light couples with the periodic array of surface features 40' on the first surface 20a. The light is then transmitted via the single subwavelength-diameter aperture 30 to the second surface 20b which is also provided with surface features 40, the light is then directed with a small optical divergence towards the optical storage media 112. The periodicity of the surface features 40' on the first surface 20a should be chosen so that it matches the wavelength of the incident light in the waveguide to provide maximum coupling with said surface features 40' and transmission through the aperture 30. See Ghaemi et al., supra. The periodicity of the surface features 40 on the second surface 20b should be chosen to increase the enhanced transmission provided by the first surface 20a and to direct the output light beam in a desired direction according to wavelength(s) transmitted and to achieve low optical divergence. FIG. 17A shows an embodiment where both the first and the second surfaces are provided with a periodic surface feature 40', respectively 40. Alternatively the aperture 30 may be located at the end of the surface feature 40 on the second surface 20b as shown in FIG. 17B. Yet alternatively, the aperture 30 may be located within a coiled wire (e.g. a spiral) 112 at the tip of the read/write head as shown in FIG. 18. This is particularly useful for opto-magnetic storage since a magnetic field can be provided by the coiled wire. The surface topography provided naturally by the coiled wire can be used to provide at least the surface feature 40 on the second surface 20b, in accordance with the present invention, as shown in FIGS. 18A and 18B. As shown in FIG. 18A, the wire 112 which can carry an electric current is electrically insulated with an insulator 113. The coil is then covered with a metal 20 to provide the embodiment already illustrated in FIG. 5. In the particular embodiment in FIG. 18A both the first and the second surfaces are provided with surface features. In the above preferred embodiments shown in FIGS. 17 and 18 both the first and the second surface are provided with surface features. The invention also encompasses read/write heads having only a second surface provided with a periodic surface feature 40.

Optical storage methods, such as CD-ROM, DVD and opto-magnetic disks, are becoming increasingly used because they provide high density storage at low cost and relatively fast read/write capacity. Nevertheless still higher storage densities and fast read/write capacity are desired. In order to increase the storage densities subwavelength optical beams must be provided that writes and reads the data which is extremely difficult if not impossible to achieve by conventional optics consisting of lenses. If a subwavelength aperture is used to limit the size of the optical beam it suffers from poor transmittance and diffraction of light in all directions as discussed above. As a consequence, the reading and the writing rates tend to become slower to compensate for the low intensities of the optical beams in the subwavelength regime. To increase the read and write speed capacity of the optical storage methods, whether subwavelength beams are used or not, several beams of different wavelengths could be provided to read and to write at the same time different information at nearby locations as the read/write head moves across the optical storage media. This would require complex lenses and alignment devices to achieve and therefore is not considered a practical solution to the problem. The read/write heads of the present invention provide solutions to the above problems. The read/write heads described above and shown in FIGS. 17 and 18 provide light beams with small optical divergence and wavelength dependent directionality. As a result, one or more light beams of different wavelength can be directed at the storage medium to read and write different data at different locations at the same time thereby significantly increasing the reading and writing speed capacity. When subwavelength optical beams are needed, the conventional read/write heads provided with a subwavelength aperture must be placed in close proximity of the surface of optical storage medium (typically within 50 nm) which is technically very difficult. This is necessary in order to preserve the small beam size since, as discussed above, light is diffracted in all directions at the exit of the aperture which quickly expands the beam size and weakens its intensity. The advantages of the read/write heads of the present invention shown in FIGS. 17 and 18 are that not only do they enhance the enhanced transmission of the aperture but they also overcome the diffraction problem by directing the light as a beam with low divergence. As a result the read/write no longer has to be placed as close to the surface of the optical storage medium as in the prior art when subwavelength read/write capability is desired.

Figure 19A:
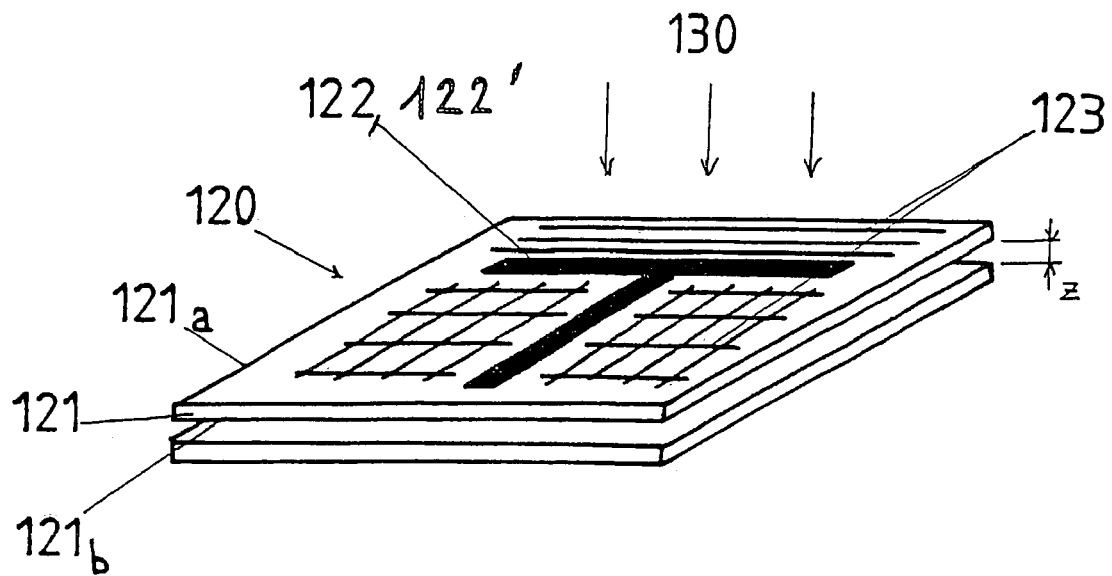
FIG. 19A is a perspective, schematic diagram showing an enhanced light transmission apparatus with divergence and directionality control of the present invention utilized as a photolithographic mask according to the present invention.

Another application of the invention is shown in FIG. 19. Indeed, the enhanced light transmission apparatus with optical divergence and directionality control of the present invention, with a single or several apertures, can be used to make novel masks for subwavelength photolithography by virtue of the arrangement of the periodic surface features and the apertures in the metallic mask. The mask 120 comprises a metal film 121, which may be deposited on a substrate (not shown), having one or more apertures 122 with openings 122' provided therein. A plurality of periodically arranged surface features 123, such as grooves, are provided on at least the second surface 121b of metal film 121 so as to provide a periodic surface topography on at least the second surface 121b of metal film 121. In the preferred embodiment both the first surface 121a and the second surface 121b are provided with a periodic surface topography 123', respectively 123. Incident light 130, having a wavelength λ which is much greater than the width of the apertures 122, is directed at first surface 121a of the mask 120. Incident light 130 couples with the periodic surface topography and is projected through the apertures 122 in metal film 120, coupled with the to yield lithographed images having features much smaller than (λ/2).

Figure 19B:
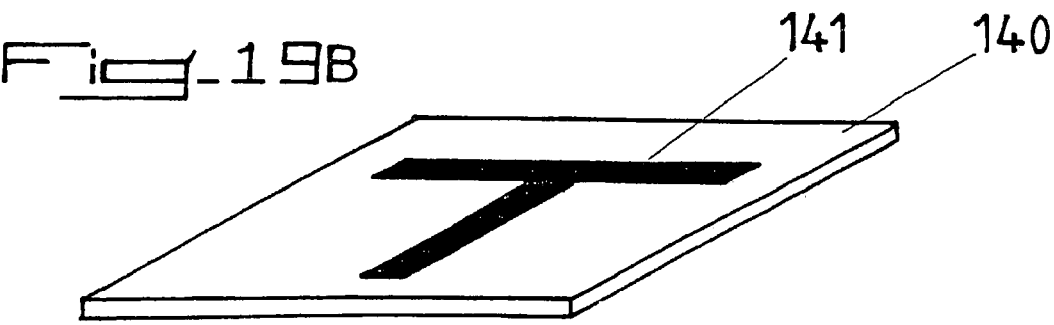
FIG. 19B is a perspective, schematic diagram showing a resulting pattern transferred onto a substrate with a photosensitive coating using the photolithographic mask of the present invention.
Figure 19C:
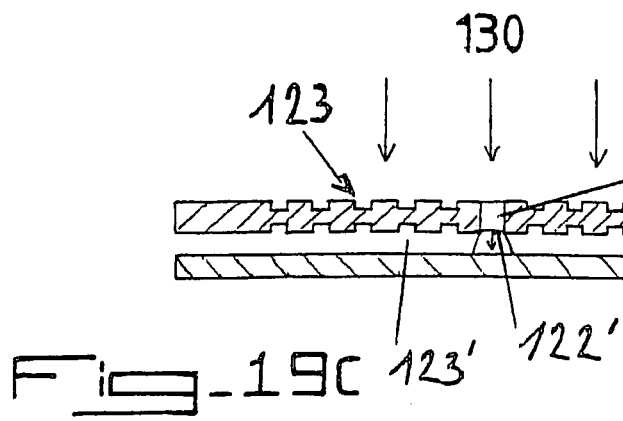
FIG. 19C is a cross-sectional, schematic diagram showing an enhanced light transmission apparatus with divergence and directionality control of the present invention utilized as a photolithographic mask according to the present invention illustrated in FIG. 19A.

To illustrate the lithographic operation of the invention, the transfer of the letter "T" and onto a substrate 140 coated with photosensitive material is shown in FIG. 19B. Slit-shaped apertures 122 are fabricated in the metal film 121 in an arrangement corresponding to the image to be transferred (in this case, the letter "T"). Light 130 is directed at the mask 120, whereupon the light is transmitted through the apertures 122 to the periodic surface topography afforded by the surface features 123 as described above. As a result, the photoresist-coated substrate 140 is exposed in the pattern of the desired image 142. The cross-sectional view shown in FIG. 19C illustrates how the transmitted light through the aperture 122 is directed at the photoresist surface with a narrow optical divergence as provided by the present invention.

The photolithographic masks of the present invention allow subwavelength-width points or lines to be written onto photosensitive material without using deep-UV and X-ray sources. Instead, regular UV light sources, or even visible light sources, may be used. In addition, the present invention permits the use of conventional photoresists, such as UV-sensitive or visible light-sensitive, photoresists, instead of X-ray sensitive photoresists. In the prior art, only enhanced transmission was provided by surface features on the first surface as described in U.S. Pat. No. 6,236,033 to Ebbesen et al. In the present invention, the presence of periodic surface features on both first and the second surfaces of the metal mask provides enhancement of the enhanced transmission and the presence of periodic surface features on at least the second surface results in a low optical divergence of the light transmitted through the mask. As a result, the mask does not have to be placed so close to the surface of the photoresist as compared to the prior art making it easier to transfer the pattern of the mask to the photoresist.

Figure 20:
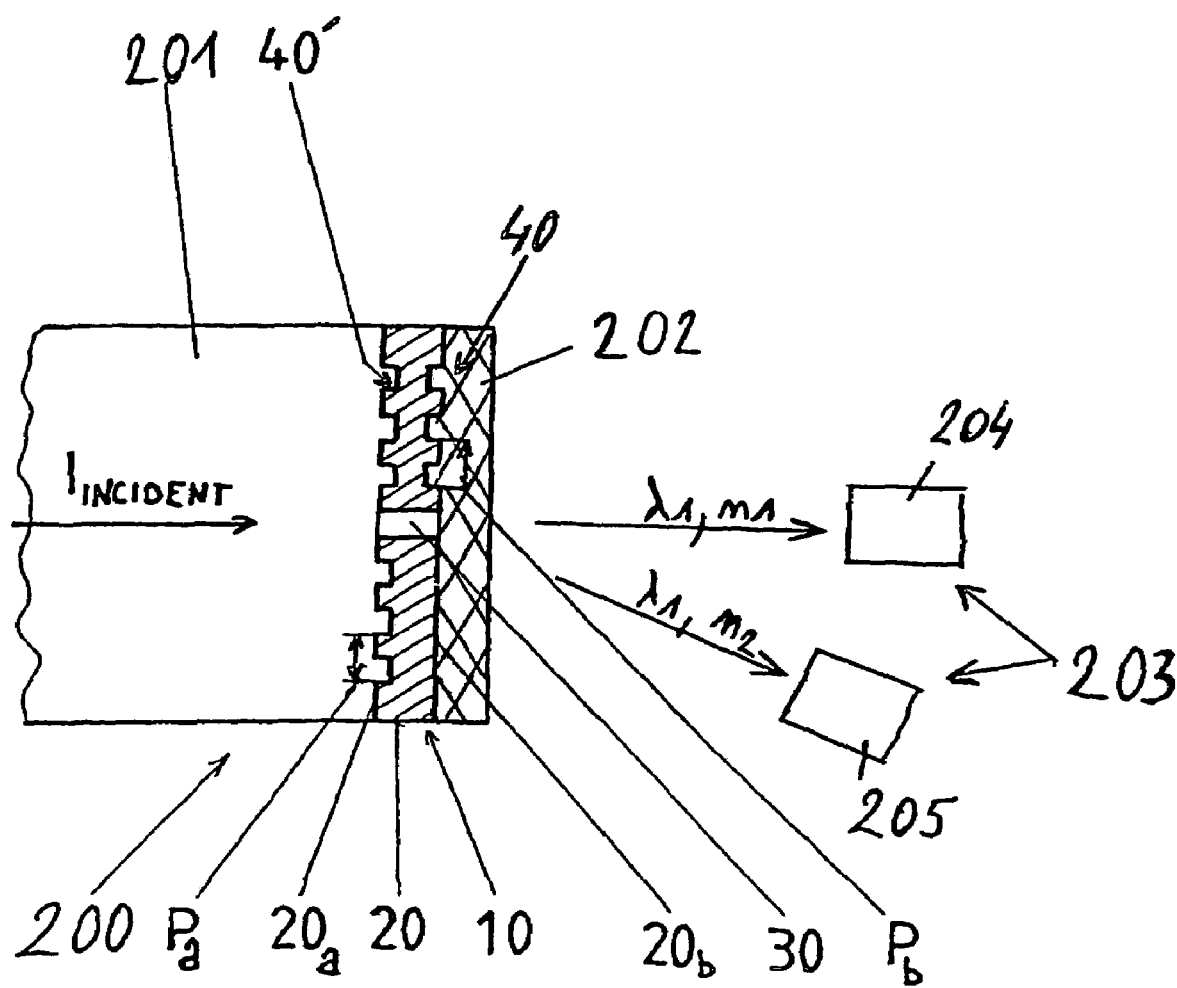
FIG. 20 is a cross-sectional, schematic view of an optical switching device, wherein the surface features of the exit surface are covered with a material with selectively variable refraction index.

Another application of the invention is in optical switching. FIG. 20 shows an exemplary embodiment of an optical switch 200 constructed in accordance with the present invention. Light (indicated by the arrow labeled $I_{incident}$) is incident on an enhanced light transmission apparatus with optical divergence and directionality control 10. The apparatus 10 includes a metal film 20 which may be (but not limited to being) deposited on a substrate 201. The metal film 20 is provided with an aperture 30, and the metal film 20 has periodically arranged surface features 40 provided on at least the second 20b. Substantially adjacent to the second surface 20b is a material with selectively variable refractive index 202. The selectively variable refractive index material 202 is a material whose refractive index may be selectively changed by the application of an electric potential or an electric field or an electric current or by the application of a light beam. For instance, the selectively variable refractive index material 202 may be (but not limited to) a liquid crystal or a non-linear optical material. The transmitted light is redirected at different angles according to wavelength towards light collecting devices 203. The light collecting devices can be (but not limited to being) optical fibers, lenses, mirrors and light detectors. For illustrative purposes only two collecting devices are shown in FIG. 20. The invention also encompasses more than two collecting devices 203. As illustrated in FIG. 20, the direction of the transmitted light beam of wavelength can be modified by selectively changing the refractive index of the material 202 from $n_1$ to $n_2$ and consequently the transmitted light, which is directed at collecting device 204 when the refractive index is $n_1$, is redirected at the collecting device 205 when the refractive index is changed to $n_2$. Moreover, the transmitted light is not just redirected but also modulated in each collecting device. The period $P_a$ of surface features 40 of the first surface 20a and the period $P_b$ of the surface features of the second surface 20b can be equal or different. In this exemplary embodiment, the aperture 30 is located at one end of the periodic surface features 40 on the second surface 20b as shown in FIG. 20. The invention also encompasses other locations for the aperture 30 and its opening 30' in relation to the periodic surface features 40. In FIG. 20, the apparatus 10 is shown with a single aperture 30 but a plurality of apertures may also be provided in the metal film depending on the number and the type of light collecting devices without deviating from the invention. While the selectively variable refractive index material 202 is shown in FIG. 20 as being substantially adjacent to the second surface 20b, it may be located substantially adjacent to first surface or both surfaces without deviating from the invention. Although not shown in FIG. 20, the invention also encompasses the reverse optical process by which light travels in the reverse direction to that shown in FIG. 20. In that case, the output light from devices 203 (204, 205, . . . ) arriving at different angles on the enhanced light transmission apparatus with optical divergence and directionality control 10 can be selectively transmitted through the aperture 30 or not by selectively varying the refractive index of material 202.

In the prior art described in U.S. Pat. No. 6,040,936 to Kim et al., only the modulation of the transmission of an array of holes is provided by selectively changing the refractive index of a material adjacent to the array. In the present invention, the presence of surface features surrounding the exit opening of the aperture substantially adjacent to the selectively variable refractive index material provides, in addition to light modulation, selective control over the directionality and the optical divergence of the transmitted light.

As can be seen from the foregoing, the present invention and its various practical issues are based upon the unexpected discovery made by the inventors that it is possible to overcome optical diffraction of light emerging from one or several subwavelength aperture(s) or opening(s) by providing a periodic or quasi-periodic texture, structure, corrugation or similar repetitive feature on the surface surrounding the exit opening(s).

In particular, the light emerging or exiting from such an aperture or opening consists of a light beam with a given directionality and a limited angular divergence, depending on the characteristics of the light and of the component or structure comprising said aperture/opening and repetitive feature.

While there has been described and illustrated various enhanced light transmission apparatus for use in certain applications, it will be apparent to those skilled in the art that variations and modifications are possible without deviating from the spirit and broad teachings of the invention which shall be limited solely by the scope of the claims appended hereto.

The invention claimed is:

1. Apparatus (10) for emitting light with a controlled directionality and optical divergence from at least one opening (30'; 122'), comprising:
   a light impervious surface structure (20; 120) comprising said at least one opening (30'; 122'),
   a periodic or quasi-periodic surface topography comprising one or several surface feature(s) (40; 123) and associated with said at least one opening on said surface structure, whereby light($I_{OUTPUT}$) emerging from said opening(s) (30'; 122') interacts with surface waves on said surface structure (20; 120) thereby providing controlled directionality and optical divergence of the emitted light($I_{OUTPUT}$),
   characterised in that each of the at least one opening (30'; 122') corresponds to the opening of a blind hole (30"), accommodating a light source (31), preferably in the vicinity of said opening.

2. Apparatus according to claim 1, characterised in that the or each surface topography has a periodic or quasi-periodic arrangement in at least one direction originating from the concerned opening (30'; 122') and comprised within the surface plane of the surface structure (20; 120).

3. Apparatus according to claim 1, characterised in that said surface structure (20; 120) comprises a single opening (30'; 122') with a corresponding periodic or quasi-periodic surface topography.

4. Apparatus according to claim 1, characterised in that said surface structure (20; 120) comprises several spaced apart openings(30'; 122'), each provided with a corresponding particular periodic or quasi-periodic surface topography.

5. Apparatus according to claim 1, characterised in that said surface structure (20; 120) comprises several spaced apart openings(30'; 122'), provided with at least a partially common periodic or quasi-periodic surface topography.

6. Apparatus according to claim 1, characterised in that the surface topography comprises at least two protruding and/or recessing structural surface features (40; 123).

7. Apparatus according to claim 6, characterised in that the surface features (40; 123) are made of, defined by or filled with a material having a refractive index which is different from the refractive index of the material of the surface structure (20; 120).

8. Apparatus according to claim 6, characterised in that the surface features (40; 123) consist of incrustations of a material having a refractive index which is different from the refractive index of the material of the surface structure (20; 120), said incrustations being flush with said surface structure (20; 120).

9. Apparatus according to claim 6, characterised in that the surface structure (20; 120) and the surface features (40; 123) are covered with a material (202) having a selectively variable refractive index, said index being controllably adjustable by external triggering.

10. Apparatus according to claim 1, characterised in that the surface topography comprises at least two surface features (40) as structural or material discontinuities.

11. Apparatus according to claim 1, characterised in that the surface topography comprises at least two continuous or discontinuous profiled surface features (40; 123) having, at least partly, a circular, triangular, rectangular or polygonal cross section and extending longitudinally on at least one side of the concerned opening (30'; 122') or at least partly around this latter, within a given angular range or several ranges.

12. Apparatus according to claim 1, characterised in that the surface topography comprises a plurality of surface features (40) as dimples and/or dead holes arranged in a periodic or quasi-periodic manner in at least one direction originating from the concerned opening (30', 122').

13. Apparatus according to claim 1, characterised in that the surface features (40; 123) forming the surface topography are arranged symmetrically around the opening(s) (30'; 122').

14. Apparatus according to claim 1, characterised in that the surface features (40; 123) forming the surface topography are arranged asymmetrically around the opening(s) (30'; 122') on one side only of a plane cutting said opening(s).

15. Use of an apparatus according to claim 1 comprising the step of producing light with given directionality and limited angular divergence, whereby light ($I_{OUTPUT}$) emerging from said opening interacts with a surface wave mode on said surface structure thereby providing controlled directionality and optical divergence of the emitted light.

16. Wavelength multiplexing device, characterised in that it comprises an apparatus (10) according to claim 1, with a single opening (30').

17. Wavelength dispersion device, characterised in that it comprises an apparatus (10) according to claim 1, with a single opening (30').

18. Angular wavelength filter, characterised in that it comprises an apparatus (10) according to claim 1.

19. Read/write head for optical data storage media, characterised in that it comprises an apparatus (10) according to claim 1.

20. Near-field optical scanning microscope, characterised in that it comprises an apparatus (10) according to claim 1.

21. Photolithographic mask, characterised in that it comprises an apparatus (10) according to claim 1.

22. Optical switching device, characterised in that it comprises an apparatus (10) according to claim 1.

23. Bright light source, characterised in that it comprises an apparatus according to claim 1.

24. Apparatus (10) for emitting light with a controlled directionality and optical divergence from at least one opening (30'; 122'), comprising:
a light impervious surface structure (20; 120) comprising said at least one opening (30'; 122'),
a periodic or quasi-periodic surface topography comprising one or several surface feature(s) (40; 123) and associated with said at least one opening on said surface structure, whereby light ($I_{OUTPUT}$) emerging from said opening(s) (30'; 122') interacts with surface waves on said surface structure (20; 120) thereby providing controlled directionality and optical divergence of the emitted light ($I_{OUTPUT}$),
characterised in that each of the at least one opening (30'; 122') corresponds to the exit opening of an aperture (30; 122) extending through a film or plate like element or part comprising or formed by said surface structure (20; 120), said element or part having, on one side, a first surface (20a; 121a) provided with the entry opening of said aperture (30; 122) and intended to be subjected to incident light ($I_{INCIDENT}$),
characterised in that the first surface (20a; 121a) is also provided with a periodic or quasi-periodic surface topography associated with the at least one entry opening of the at least one aperture (30; 122) and comprising one or several surface feature(s) (40'; 123'), and
characterised in that the surface topography of the first surface (20a; 121a) and the surface topography of the second surface (20b; 121b) are identical.

25. Apparatus according to claim 24, characterised in that said element or part having, on one side, the first surface (20a; 121a) provided with the entry opening of said aperture (30; 122) and intended to be subjected to incident light ($I_{INCIDENT}$) and, on the other side, a second surface (20b; 121b) provided with said exit opening (30'; 122').

26. Apparatus according to claim 25, characterised in that the film or plate like element or part (20; 120) is mounted on or in front of the exit surface of a light emitting or transmitting device or part (81; 90; 101; 111; 201).

27. Apparatus according to claim 25, characterised in that the film or plate like element or part (20; 120) is mounted on or in front of the entry surface of a light receiving device or part (81).

28. Apparatus according to claim 24, characterised in that the surface structure (20; 120) consists of a metal film having at least one aperture (30; 122) extending through it, wherein the surface of the film comprising the exiting opening (30'; 122') is provided with said periodic or quasi-periodic surface topography.

29. Apparatus according to claim 24, characterised in that at least one dimensional parameter and/or shape characteristic of the surface topography of the first surface (20a; 121a) is, at least slightly, different from at least one corresponding dimensional parameter and/or shape characteristic of the surface topography of the second surface (20b; 121b).

30. Apparatus according to claim 24, characterised in that the period or quasi-period of the surface topography of the first surface (20a; 121a) is different from the period or quasi-period of the surface topography of the second surface (20b; 121b).

31. Read/write head with multiple wavelength read/write capacity at different locations for optical storage media, characterised in that it comprises an apparatus (10) for emitting light with a controlled directionality and optical divergence from at least one opening (30'; 122'), said apparatus comprising
a light impervious surface structure (20; 120) comprising said at least one opening (30'; 122'),
a periodic or quasi-periodic surface topography comprising one or several surface feature(s) (40; 123) and associated with said at least one opening on said surface structure, whereby light ($I_{OUTPUT}$) emerging from said opening(s) (30'; 122') interacts with surface waves on said surface structure (20; 120) thereby providing controlled directionality and optical divergence of the emitted light ($I_{OUTPUT}$),
characterised in that each of the at least one opening (30'; 122') corresponds to the opening of a recess or a cavity (30'') in the surface structure (20), accommodating a light source (31), preferably in the vicinity of said opening,
characterised in that the surface topography comprises at least two protruding and/or recessing structural surface features (40; 123), and
characterised in that the surface structure (20; 120) and the surface features (40; 123) are covered with a material (202) having a selectively variable refractive index, said index being controllably adjustable by external triggering.

* * * * *